US011891088B1

(12) United States Patent
Kobilarov et al.

(10) Patent No.: US 11,891,088 B1
(45) Date of Patent: Feb. 6, 2024

(54) ADVERSARIAL AGENT CONTROLS GENERATION AND PROBLEMATIC SCENARIO FORECASTING

(71) Applicant: Zoox, Inc., Foster City, CA (US)

(72) Inventors: Marin Kobilarov, Baltimore, MD (US); Jefferson Bradfield Packer, San Francisco, CA (US); Gowtham Garimella, Burlingame, CA (US); Andreas Pasternak, Mountain View, CA (US); Yiteng Zhang, Albany, CA (US); Ruikun Yu, San Jose, CA (US)

(73) Assignee: ZOOX, INC., Foster City, CA (US)

( * ) Notice: Subject to any disclaimer, the term of this patent is extended or adjusted under 35 U.S.C. 154(b) by 308 days.

(21) Appl. No.: 17/347,088

(22) Filed: Jun. 14, 2021

(51) Int. Cl.
*B60W 60/00* (2020.01)
*G06N 20/00* (2019.01)
*G07C 5/08* (2006.01)
*G07C 5/00* (2006.01)
*B60W 50/00* (2006.01)

(52) U.S. Cl.
CPC ......... *B60W 60/0015* (2020.02); *G06N 20/00* (2019.01); *G07C 5/008* (2013.01); *G07C 5/0808* (2013.01); *B60W 2050/0075* (2013.01); *B60W 2554/404* (2020.02); *B60W 2556/45* (2020.02)

(58) Field of Classification Search
None
See application file for complete search history.

(56) References Cited

U.S. PATENT DOCUMENTS

2020/0174471 A1* 6/2020 Du .................. G08G 1/0112
2022/0324484 A1* 10/2022 Hruschka .......... B60W 30/0956

* cited by examiner

*Primary Examiner* — Peter D Nolan
*Assistant Examiner* — Jacob Kent Besteman-Street
(74) *Attorney, Agent, or Firm* — Lee & Hayes P.C.

(57) ABSTRACT

A reward determined as part of a machine learning technique, such as reinforcement learning, may be used to control an adversarial agent in a simulation such that a component for controlling motion of the adversarial agent is trained to reduce the reward. Training the adversarial agent component may be subject to one or more constraints and/or may be balanced against one or more additional goals. Additionally or alternatively, the reward may be used to alter scenario data so that the scenario data reduces the reward, allowing the discovery of difficult scenarios and/or prospective events.

20 Claims, 7 Drawing Sheets

US 11,891,088 B1

ADVERSARIAL AGENT CONTROLS GENERATION AND PROBLEMATIC SCENARIO FORECASTING

BACKGROUND

Running simulations of scenarios may provide a valuable method for testing autonomous systems and/or machine-learned model pipelines, such as those incorporated in autonomous vehicles. However, human behavior may be unpredictable and it may therefore be difficult to anticipate infrequent anomalous behavior or difficult scenarios. For example, a human driver may suddenly swerve off a highway onto an off-ramp, make a turn in front of oncoming traffic, turn on a red light at an intersection where such a turn is illegal, etc.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
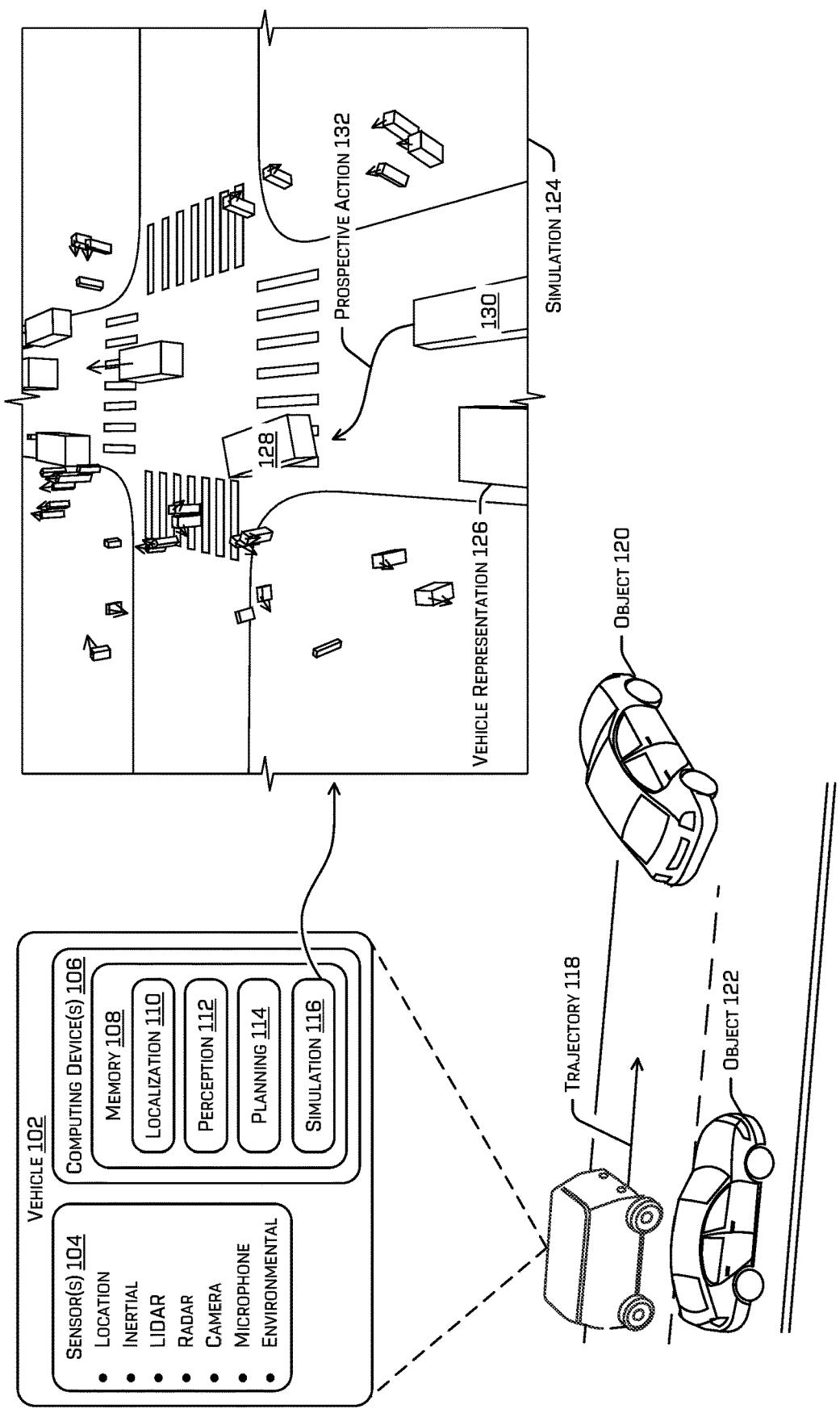
FIG. 1 illustrates an example scenario in which an autonomous vehicle may be controlled based at least in part on a simulation comprising an adversarial agent and/or using a component that was trained using such a simulation.

As discussed above, it may be difficult to prepare an autonomous vehicle for all contingencies because of the occurrence of anomalous behavior and rare scenarios. This problem may be multiplied by the fact that the autonomous vehicle may handle some anomalous behavior and/or rare scenarios well, without any cognizable reason for what differentiates such behavior or scenario from behavior and/or a scenario that the autonomous vehicle doesn't handle well. This application relates to techniques for improving component(s) of an autonomous vehicle by increasing the number of situations the autonomous vehicle can interact with successfully (e.g., safely, without getting stuck or hesitating, by taking a most efficient or logical route).

To increase the number of situations the autonomous vehicle can handle, the techniques may include scoring the autonomous vehicle's performance as it encounters various behaviors and/or scenarios. This scoring process may be part of determining a reward as part of a reinforcement learning technique for training a component of the autonomous vehicle. The score may be used to generate a simulated agent (e.g., dynamic object) that takes actions with the goal of decreasing the score/reward for the vehicle's performance. In particular, the techniques may include generating a machine-learned model and/or set of rules, collectively an adversarial agent component, that control actions taken by the simulated agent, i.e., the simulated adversarial agent. Training this adversarial agent component may be based at least in part on a set of constraints and the reward determined based on performance of the autonomous vehicle in real life and/or in a simulation. The set of constraints may limit the types and/or extent of actions that the adversarial agent component may cause the adversarial agent to take. These constraints may thereby prevent the adversarial agent from taking actions that would be impossible or near-impossible to prevent, such as directly and swiftly swerving into the simulated autonomous vehicle from an adjacent lane, crossing a double-yellow line at an unlawful speed at a last possible second, etc.

The techniques may additionally or alternatively include modifying scenario data to reduce the score/reward. Scenario data may specify a configuration, conditions, and/or parameters used by a simulation component to set up and/or run a simulation. For example, the scenario data may identify a pose (e.g., location and/or orientation) of a simulated autonomous vehicle in a simulated environment; a layout and features of the environment; a type, position, orientation, speed, etc. of object(s) in the environment, a grade and/or bank associated with a roadway, kinematic coefficients and/or other characteristics associated with the environment, and/or the like. Modifying the scenario data may comprise modifying any of the attributes of the scenario data, such as a speed of a dynamic object, modifying a layout of a roadway, modifying the position of an object relative to the simulated autonomous vehicle or vice versa, etc.

To give an example, a simulation component may instantiate and execute a simulation based on parameters specified by first scenario data. Component(s) of the autonomous vehicle may receive simulated data, such as simulated sensor data and/or simulated perception data, which the component(s) of the autonomous vehicle may use to output control signals for controlling motion of the autonomous vehicle. These control signals may be used to control a simulated representation of the autonomous vehicle in the simulated environment in addition to or instead of controlling the autonomous vehicle in real life—in other words, the simulation may occur while the autonomous vehicle is conducting real-world driving, in response to the autonomous vehicle's real-world driving, or in a completely synthetic environment where the control signals are used to control the simulated representation of the autonomous vehicle exclusively. A performance component that receives a record of how the simulated representation (and/or the real-world autonomous vehicle) was controlled by the autonomous vehicle component(s) may determine a reward based at least in part on how the autonomous vehicle performed in the simulation. This reward may be used to modify the first scenario data, such that the reward would be reduced or may be likely to be reduced.

The reward may be based at least in part on a variety of operating parameter(s), such as a minimum distance between the vehicle and a nearest object, an acceleration required to avoid impact, a time until impact, a deviation from a route, whether a jerk and/or acceleration by the vehicle met or exceeded a threshold jerk and/or a threshold acceleration, etc. In some examples, the reward may comprise a weighted sum of sub-rewards. In an additional or alternate example, at least one of the sub-rewards may be a regressed value determined by a machine-learned model. For example, the reward output by the machine-learned model may be based at least in part on a predicted likelihood of impact determined by the machine-learned model. Additional or alternate metrics and/or manners of determining such a reward are discussed in further detail in U.S. patent application Ser. No. 17/216,547, filed Mar. 29, 2021, and U.S. patent application Ser. No. 16/953,277, filed Nov. 19, 2020, both of which are incorporated by reference herein for all intents and purposes. Modifying the scenario data may include modifying a position, speed, etc. of an object and/or a configuration of the environment such that one or more of the metrics identified above may be negatively impacted. Similarly, the adversarial agent component may control the adversarial agent to negatively impact one or more of these metrics. For example, the adversarial agent component and/or modifications to the scenario data may result in the simulated autonomous vehicle coming closer to an object, needing to accelerate harder to avoid an object, needing to react more quickly to an object that is revealed around a blind corner, etc.

The techniques may additionally or alternatively include using the adversarial agent component and/or modification(s) to the scenario data to determine a prospective scenario/event that would be difficult for the autonomous vehicle to handle. For example, the prospective scenario may be a scenario (e.g., configuration or condition of a roadway; weather condition; positioning, speed, type, action, etc. of an object) or an action of the adversarial agent that is associated with a simulation where the simulated representation of the autonomous vehicle violated an operating constraint. The operating constraint may be a threshold associated with any one of the metrics discussed above for determining the reward or, in yet another example, the operating constraint may be a threshold associated with the reward itself. To give a practical example, the operating constraint may comprise a minimum distance determined according to the techniques discussed in U.S. patent application Ser. No. 16/389,858, filed Apr. 19, 2019, the entirety of which is incorporated by reference herein, a speed limit set by the law, an acceleration or jerk associated with comfort metrics determined by a set of tests, and/or the like. The techniques may include identifying the prospective scenario and/or determining an action that would increase a likelihood of the prospective scenario occurring if the autonomous vehicle were to take the action.

For example, the prospective scenario may be used by a planning component of the autonomous vehicle, such as to avoid increasing a likelihood of the prospective scenario or, in an additional or alternate example, the prospective scenario may be presented via a teleoperations device. In the latter example, the prospective scenario may be presented via a user interface as a representation of the scenario and/or action identified by the prospective scenario. The teleoperations device may additionally or alternatively identify a teleoperations action or a portion thereof that may increase a likelihood of the prospective scenario occurring. The teleoperations device may associate the teleoperations action or a portion thereof with a warning or may make the action unavailable for selection by a teleoperator (e.g., via graying out a user interface element associated with the action, removing the user interface element from the user interface, removing the user interface element from a quick reference list of actions) or only selectable with additional confirmation (e.g., an additional input from the teleoperator, authorization of a superior).

The techniques discussed herein may be used to test operation of an autonomous vehicle (e.g., a planning component of an autonomous vehicle), which may generate a trajectory for controlling operation of the autonomous vehicle based at least in part on simulated sensor data associated with the simulated motion of an agent. The perception data produced by the perception component based on simulated sensor data may also be provided to the planning component for testing the planning component. In some examples, the techniques used herein may be used to validate a version of a component of the autonomous vehicle and, upon successful completion of a specified number, percentage, and/or type of scenarios, the component may be updated to the version (e.g., by updating software, swapping out and/or adding hardware).

The techniques may improve the testing and/or training of one or more components of the autonomous vehicle (e.g., a localization component, a perception component, a planning component) and may thereby improve the accuracy thereof and the safety and efficacy of operation of the autonomous vehicle (or any other system that integrates such a perception component and/or planning component) by increasing the difficulty of the training examples used for training one or more components of the autonomous vehicle. The scenario modification techniques and/or adversarial agent component may be used to increase a number of scenarios/interactions that the autonomous vehicle may successfully navigate, e.g., by operating without violating an operating constraint. These techniques may also reduce the training time and/or number of computational cycles required to train a component of the autonomous vehicle to be able to handle a particular number of scenarios. Moreover, the scenario modification and adversarial agent component may uncover development bugs or other weaknesses in the autonomous vehicle, allowing these weaknesses to be addressed when they would have gone undiscovered by human inspection. The scenario modification techniques and/or adversarial agent component may be used to avoid a prospective scenario/event that the vehicle may have a more difficult time navigating. These techniques, whether used together or separately on the vehicle, may improve the safety and efficacy of the operation of the autonomous vehicle by improving an accuracy and/or variety of output of a prediction component of the autonomous vehicle—the prediction component being trained to predict future object and/or environmental states.

Example Scenario

FIG. 1 illustrates an example scenario 100 including a vehicle 102. In some examples, the example scenario 100 may be a real-world scenario and/or the example scenario 100 may be a representation of a real-world scenario modeled as a simulated scenario. In examples where the example scenario 100 is a simulated scenario, the example scenario 100 may be determined based at least in part on input received at a user interface of a computing device (e.g., a user of the computing device may define the environment, objects therein, and/or characteristics thereof) and/or the example scenario 100 may be based at least in part on log data received from one or more autonomous vehicles (i.e., data captured and stored during actual driving in a physical environment including raw sensor data and data derived therefrom including detections, predictions, control signals, etc.). The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein and an example where scenario 100 is a real-world example, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 104 on the vehicle 102 and in a simulation, one or more of sensor(s) 104 may be simulated. In some examples, the position of a simulated sensor may correspond with a relative position of one of the sensor(s) 104 to the vehicle 102.

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a localization component 110, a perception component 112, a planning component 114, and/or a simulation component 116. In general, localization component 110 may comprise software and/or hardware system(s) for determining a pose (e.g., position and/or orientation) of the vehicle 102 relative to one or more coordinate frames (e.g., relative to the environment, relative to a roadway, relative to an inertial direction of movement associated with the autonomous vehicle). The localization component 110 may output at least part of this data to the perception component 112, which may output at least some of the localization data and/or use the localization data as a reference for determining at least some of the perception data.

The perception component 112 may determine what is in the environment surrounding the vehicle 102 and may include a prediction component that predicts a state of detected object(s) and/or of the environment. The planning component 114 may determine how to operate the vehicle 102 according to information received from the localization component 110 and/or the perception component 112. The localization component 110, the perception component 112, and/or the planning component 114 may include one or more machine-learned (ML) models and/or other computer-executable instructions.

In some examples, the localization component 110 and/or the perception component 112 may receive sensor data from the sensor(s) 104 and/or simulated data from simulation component 116. The techniques discussed herein may comprise adding simulation data received from the simulation component 116 to perception data output by the perception component 112, thereby improving the online prediction of possible agent behaviors. For example, the simulation component 116 may generate modified maneuvers and/or modified paths using the agent behavior model(s) discussed herein and provide the modified maneuvers and/or modified paths the planning component 114 and/or the perception component 112 in at least one example.

In some instances, the perception component 112 may determine data related to objects in the vicinity of the vehicle 102 (e.g., classifications associated with detected objects, instance segmentation(s), tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. In some examples, the objects surrounding the vehicle 102 may be simulated objects of a simulated environment. The data produced by the perception component 112 may be collectively referred to as "perception data." Once the perception component 112 has generated perception data, the perception component 112 may provide the perception data to the planning component 114.

The planning component 114 may determine trajectory 118 based at least in part on the perception data and/or other information such as, for example, simulation data generated by the simulation component 116 (e.g., which may include be based on a modified scenario, as discussed herein, and/or an agent controlled by the adversarial agent component discussed herein) and/or localization data (e.g., where the vehicle 102 is in the environment relative to a map and/or features detected by the perception component 112). For example, the planning component 114 may determine a route for the vehicle 102 from a first location to a second location; generate, substantially simultaneously and based at least in part on the perception data and/or the simulated perception data, a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 that the vehicle 102 may use to generate a drive control signal that may be transmitted to drive components of the vehicle 102. FIG. 1 depicts an example of such a trajectory 118, represented as an arrow indicating a heading, velocity, and/or acceleration, although the trajectory itself may comprise a command and/or target (future) state of the vehicle 102, which may, in turn, actuate a drive system of the vehicle 102. For example, the trajectory 118 may comprise instructions for a controller(s) of the autonomous vehicle 102 to actuate drive components of the vehicle 102 to effectuate a steering angle and/or steering rate, which may result in a vehicle position, vehicle velocity, and/or vehicle acceleration (or a simulated version thereof when the autonomous vehicle is being simulated) to track the command and/or target state. The trajectory 118 may comprise a target heading, target steering angle, target steering rate, target position, target velocity, and/or target acceleration for the controller(s) to track.

The example scenario 100 includes object 120 and object 122, both of which are vehicles in the illustrated example, although it's contemplated that the environment could include anything encountered in real-world scenarios. In an example where the simulation component 116 is running on the vehicle during operation of the vehicle, the perception component 112 may receive sensor data associated with the environment and determine a position, orientation, velocity, classification (e.g., vehicle, sedan, "passenger vehicle"), track (e.g., historical, current, and/or predicted attributes, such as position, orientation, velocity, etc.), etc. of the object 120 and/or object 122. Perception data generated by the perception component 112 and/or sensor data may be stored in a log data store, which may comprise the position and/or other attributes of object 120 and/or object 122 at a current, previous, and/or future time steps, where the future time steps may be associated with predicted data. Each time step may correspond to an interval of time (e.g., 100 milliseconds, 500 milliseconds, 1 second, any other portion of time). In at least one example, the positions 122-126 and the object classification may be associated as part of a track generated by the perception component 112. Additionally or alternatively, the simulation component 116 may run/be part of a remote computing device and/or during an offline procedure when the vehicle isn't nominally operating (e.g., the autonomous vehicle isn't in a ride-hailing mode, the autonomous vehicle is in a development mode, the autonomous vehicle is stopped), as discussed in more detail in reference to the following figure. In some examples, some examples, the sensor data may be simulated or the sensor data may be replayed from log data.

Regardless, the simulation component 116 may execute a simulation based at least in part on the sensor data, perception data, and/or log data (e.g., log data may be used in instances where the simulation is being run as part of a replay and/or where executing the simulation may be based on historical data, such as to improve the accuracy of predicted behavior of simulated objects). The log data may comprise the sensor data, perception data, planning data, etc. In other words, the log data may comprise the sensor data and any other data generated by the vehicle responsive to the sensor data. In an instance where the simulation component 116 is running on-vehicle and while the vehicle is operating, the simulation component 116 may be used to improve prediction of how dynamic (e.g., moving, changing) objects will behave and/or how their states will change in the future. Regardless of whether the simulation is running on-vehicle or not, or during normative operation or not, the simulation component 116 may determine a simulation 124 of the environment and/or the objects therein.

In some examples, executing the simulation 124 may include instantiating a (simulated) scenario comprising a simulated environment and/or simulated object(s) therein based at least in part on the sensor data, perception data, log data, and/or control instructions (e.g., the control instructions may be output by the planning component 114 for controlling the vehicle 102 and, as regards the simulation, the control instructions may be used to control motion of a simulated representation of the vehicle 102, vehicle representation 126). The illustrated simulation 124 also comprises representations of object 120 and object 122, representation 128 and representation 130, respectively.

The techniques discussed herein may comprise modifying how the simulation component 116 instantiates and/or carries out the scenario by modifying the scenario. Modifying the scenario may include modifying attribute(s) of the environment and/or object(s), as indicated by the perception data and/or log data, that may change. For example, the classification of an object is unlikely to change in most scenarios, so this attribute may go unmodified, but the position, velocity, or the like of an object or the friction coefficient of a surface in the environment (particularly in winter conditions) may change. For the latter examples, the scenario modification may include modifying an attribute of an object at the beginning of or at any point during the simulation, such as moving an object further or closer to the vehicle representation 126, increasing the velocity of the object compared to the detected velocity of the object as indicated by the perception data, etc.

Additionally or alternatively, the simulation 124 may include a simulated object that is controlled by an adversarial agent component, in addition to or instead of a nominal prediction component of the simulation component 116 or a prediction component of the perception component 112. The adversarial agent component may control simulated motion of a simulated representation in the simulation 124, such as representation 130. In particular, the adversarial agent component may control motion of representation 130 in the simulation 124 based at least in part on a reward/score determined by a machine-learning training component that determines a reward based on how the vehicle 102 operates. For example, the machine-learning component may determine the reward based at least in part on a reinforcement learning algorithm that is training a component of the vehicle 102. In some examples, this machine-learning component that generates the reward as part of the reinforcement learning algorithm may execute on and/or be part of the vehicle and/or may execute on and/or be part of a remote computing device.

The adversarial agent component may control the representation 130 to reduce the reward calculated for how the vehicle representation 126 is operated by the planning component 114. In some examples, the simulation 124 may be executed as part of a forecasting/prediction operation, so one or more simulations may be executed to determine a prospective scenario/event (e.g., a "worst-case" scenario), such as where the vehicle 102 violates an operating constraint, or at least a scenario that the vehicle 102 may not handle as well, such as the vehicle 102 getting near to violating an operating constraint (e.g., within a range of the operating constraint). One or more simulations by the simulation component 116 may be used to determine such a prospective scenario, which may include a prospective action 132 or other state associated with an object or the environment. In the illustrated example, the prospective action 132 includes the representation 130 cutting off the vehicle representation 126.

Note that the prospective scenario and/or a prospective action indicated by the prospective scenario may differ from a predicted state/action determined by the perception component 112 in that predicted state or action may be determined by the perception component 112 to be a most likely prediction, whereas the prospective scenario and/or prospective action may be associated with a likelihood of occurring that is less than a likelihood associated with the predicted state or action.

In some examples, prediction data determined by the perception component 112 may be additionally or alternatively based at least in part on map data or other data. In some examples, the prediction data may comprise a top-down segmentation of the environment, as described in more detail in U.S. patent application Ser. No. 15/963,833, which is incorporated by reference in its entirety herein for all purposes, and/or a top-down prediction associated with the environment, as described in more detail in U.S. patent application Ser. No. 16/779,576, which is incorporated by reference in its entirety herein for all purposes. The map data map be stored by memory 108. In some examples, the prediction data and/or other perception data may be stored as part of log data.

The vehicle 102 may transmit at least part of the sensor data, perception data, and/or a scenario label (if one is generated on-vehicle by the perception component 112) as part of the log data to a remote computing device (unillustrated in FIG. 1). In some examples, a scenario label may be associated with a portion of the log data and that scenario label may be determined by the perception component 112 and/or by a remote computing device.

Example System

Figure 2:
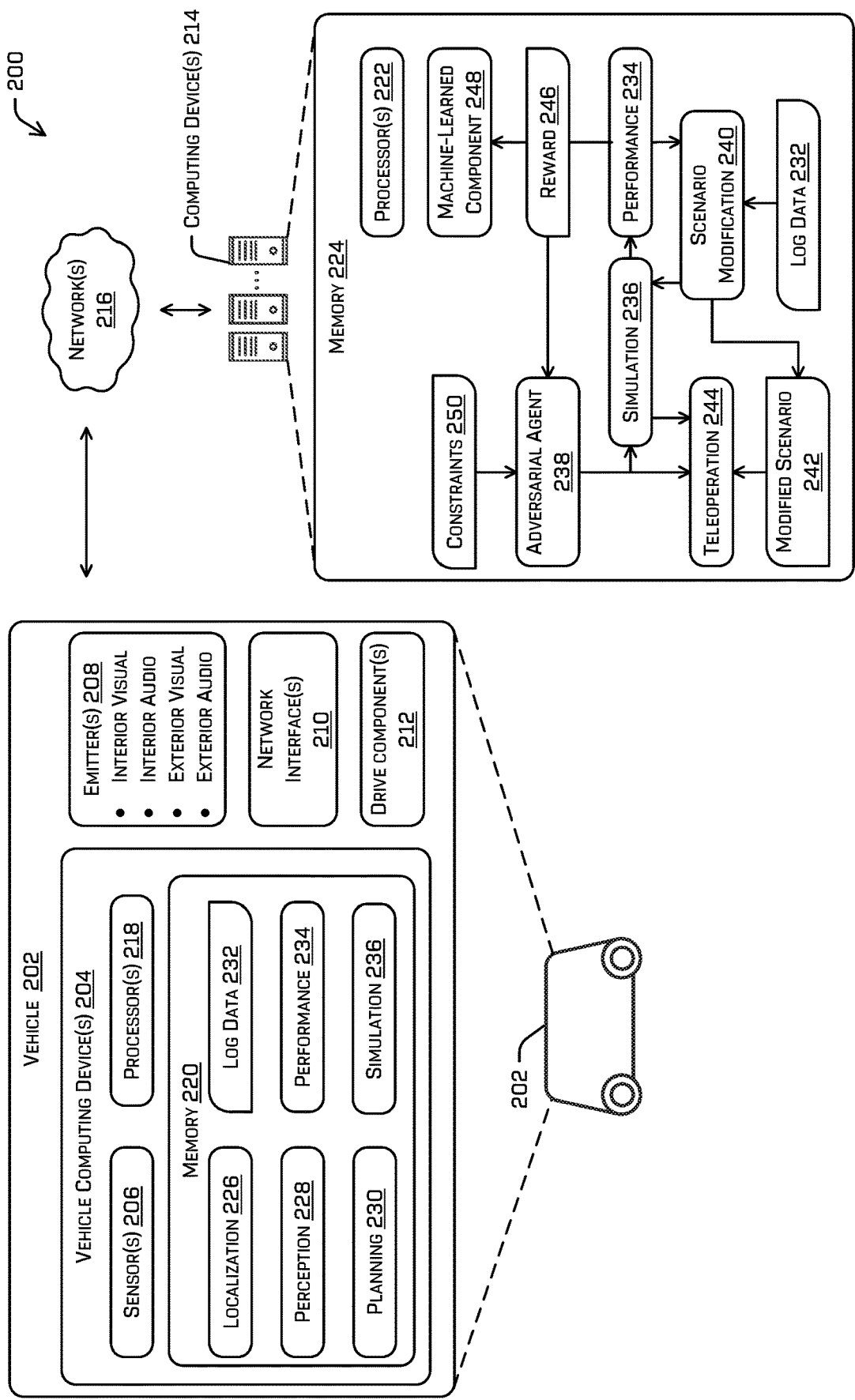
FIG. 2 illustrates a block diagram of an example architecture for generating an adversarial agent component for use in a simulation component, modifying scenario data to increase the coverage of machine-learned component(s), and/or identifying prospective actions and/or scenarios that may increase a likelihood of vehicle violation of an operating constraint.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. In some examples, the simulated sensors discussed herein may correspond to a specific type of sensor and/or any of the sensors. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, planning component 230, log data 232, performance component 234, and/or simulation component 236—zero or more portions of any of which may be hardware, such as GPU(s), CPU(s), and/or other processing units. Localization component 226 may represent localization component 110, perception component 228 may represent perception component 112, planning component 230 may represent planning component 114, and simulation component 236 may represent simulation component 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the perception component 228, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects. In some examples, the perception component 228 may include the simulation component 236 as part of the prediction portion of the perception component 228. Data determined by the perception component 228 is referred to as perception data.

The planning component 230 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 230 may comprise hardware/software-in-a-loop in a simulation (e.g., for testing and/or training the planning component 230), the planning component 230 may generate instructions which may be used to control a simulated vehicle. These instructions may additionally or alternatively be used to control motion of a real-world version of the vehicle 202, e.g., in instances where the vehicle 202 runs the simulation 236 runs on vehicle during operation. The planning component 230 may provide input to the simulation component 236 in some examples (e.g., to control a simulated representation of the vehicle 202 in a simulation executed by the simulation component 236). In some examples, the adversarial agent component 238 may additionally or alternatively be located at/operate on the vehicle 202. In such an instance, an output of the adversarial agent component 238 may be included in prediction data output by the perception component 228. In some examples, the adversarial agent component 238 output for controlling the adversarial agent component may be used to determine a belief node, according to U.S. patent application No. Ser. No. 17/394,334, filed Aug. 4, 2021, the entirety of which is incorporated herein.

The log data 232 may comprise sensor data, perception data, and/or scenario labels collected/determined by the vehicle 202 (e.g., by the perception component 228), as well as any other message generated and or sent by the vehicle 202 during operation including, but not limited to, control messages, error messages, etc. In some examples, the vehicle 202 may transmit the log data 232 to the computing device(s) 214. The vehicle 202 and/or the computing device(s) 214 may execute a pre-processing operation that include identifying different scenarios in the log data and/or perception data associated therewith. A scenario may comprise a layout of the environment (e.g., four-way controlled intersection, three-way uncontrolled intersection, six-way atypical controlled intersection, two-lane highway, one-way direction of travel) a number, type, and/or configuration of objects in the scenario. The configuration may identify a position, orientation, and/or trajectory/velocity of the objects. The techniques may comprise aggregating the log data and perception data associated with a same scenario from log data and perception data received from one or more autonomous vehicles over a data-gathering time period.

In some examples, the computing device(s) 214 may identify one or more scenarios based at least in part on the log data, which may also comprise defining a scenario. For example, the computing device(s) 214 may determine an environmental layout, a number, type, and a configuration of object(s) in the environment and/or associate this definition with one or more portions of log data associated with that scenario. In some examples, the log data 232 may comprise (historical) perception data that was generated on the vehicle 102 during operation of the vehicle. In an additional or alternate example, the perception data may include perception data generated during a simulation. In some examples, the scenario may indicate characteristics of the environment such as, for example, a position, orientation, movement, and/or characteristics (e.g., materials, height, width, depth, luminance) of one or more objects. For example, the environment may comprise one or more static objects and/or one or more agents (e.g., dynamic objects) in a configuration specified by the scenario that is to be simulated. In some examples, any of the dynamic objects instantiated in the scenario may be controlled based at least in part on the output of an agent behavior model.

In some examples, a scenario label may be determined and associated with sensor data and/or perception data stored as part of the log data. The scenario label may characterize a number, type, or configuration of objects in the environment and/or a layout of the environment. In some examples, the scenario label may be a data structure. The configuration may define a position, heading, and/or velocity of an object in the environment and the layout of the environment may identify a general characterization of the environment (e.g., four-way light controlled intersection, four-way light-controlled intersection with uncontrolled left turn lane, three-way uncontrolled intersection with one-way road). In some examples, a scenario label may be generated as part of a log data processing operation. The processing operation may comprise determining sensor data associated with perception data that identifies a relative location and/or type of object. For example, the processing operation may identify a number and/or type of objects in the regions enumerated below and associating this data with the respective sensor data. The resulting metadata annotations may be clustered and a scenario label may be associated with each disparate cluster, which may be based on number and/or type of object and/or region. In some examples, clustering the metadata annotations may comprise using a Naïve Bayes classifier and/or support vector machine to determine keywords that may be similar to each other/associated with a same cluster. For other forms of data, such as a distance from a junction, a traffic light state, or a number of roadways associated with a junction, k-means may additionally or alternatively be used. In some examples, the clustering may be based at least in part on region in which an object exists relative to the vehicle 202. The regions may include, for example:

in front of the vehicle 202,
    to a side of the vehicle 202, behind the vehicle 202,
in a lane over from a lane of the vehicle 202,
in a next further lane from the vehicle 202,
in or near a variety of intersection/junction configurations (e.g., at a four-way controlled intersection; in a T-junction; at a 4-way, 2 controlled, 2 uncontrolled intersection),
next to a roadway, etc.

In some examples, the scenario label may not be humanly comprehensible—the scenario label may merely be a cluster identifier—although in other examples, humanly comprehensible terms may be attached to the clusters (e.g., two objects to side of vehicle, one object in front of vehicle), trained embeddings, and the like.

The simulation component 236 may operate on the vehicle 202 and/or on the computing device(s) 214. If the simulation component 236 is operating on the vehicle, the simulation component 236 may provide alternate prediction(s) about the maneuver and/or path that an object may take (compared to nominal predictions made by a prediction component of the perception component 228). These alternate prediction(s) may be provided as input to the planning component 230. The simulation component 236 may run parallel to the perception component 228 and/or the simulation component 236 may be part of the perception component 228. At least some components of the perception component 228 may provide their outputs to the simulation component 236.

The simulation component 236 may determine a simulation of the environment and/or the vehicle 202. For example, the simulation may comprise a representation of a position, orientation, movement, and/or quality of portions of the environment and/or the vehicle 202. The environment may comprise an agent, such as another vehicle, a pedestrian, vegetation, a building, signage, and/or the like. Simulation may be used to test operation of various components of the vehicle 202. In some examples, simulation may be used to test the perception component 228 and/or the planning component 230 of the autonomous vehicle based at least in part on providing data from the simulation to the perception component 228 and/or the planning component 230.

The simulation component 236 may receive scenario data to determine the simulation, which may be a two or three-dimensional representation of the scenario. An adversarial agent component 238 may control motion of a dynamic object during execution of the simulation and/or the simulation may be executed based at least in part on scenario data that is modified by a scenario modification component 240. For example, the three-dimensional representation may comprise position, orientation, geometric data (e.g., a polygon representation, a digital wire mesh representation) and/or movement data associated with one or more objects of the environment and/or may include material, lighting, and/or lighting data, although in other examples this data may be left out. In some examples, the scenario data may be procedurally generated as part of a combinatorial iteration through scenarios, received responsive to interaction with a user interface of the computing device(s) 214 (e.g., responsive to user input), and/or the like, although in at least one example, the scenario data may be at least partially defined by a scenario associated with the log data (and/or the adversarial agent component 238). In some examples, a scenario modification component 240 may modify characteristics of a scenario that is generated according to any of the examples given above.

In some examples, the scenario modification component 240 may be responsible for digesting the log data 232, such as by generating a scenario label associated with log data and/or generating the scenario data for executing the simulation, including modifying the scenario data as discussed herein. The scenario modification component may provide modified scenario data 242 to the simulation component 236 and/or to a teleoperations component 244. The teleoperations component 244 may include hardware and/or software for providing instructions and/or feedback to the vehicle 202, as discussed in more detail in U.S. patent application Ser. No. 15/644,349, filed Jul. 7, 2017, the entirety of which is incorporated by reference herein for all intents and purposes. The teleoperations component 244 may present a user interface (e.g., a graphical user interface, an auditory interface, a tactile feedback component) to a teleoperator (e.g., a human user, an artificial intelligence component) that comprises sensor data, perception data, a representation of the simulation discussed herein, and/or an identification of a modified scenario and/or adversarial agent action. For example, the modified scenario and/or adversarial agent action may be a "worst-case" scenario or at least a scenario that the vehicle 202 may handle poorly or less well compared to other scenarios, as measured by how close a representation of the vehicle 202 comes to violating an operating constraint or if the vehicle 202 does violate one or more operating constraint.

The scenario data, which may be the modified scenario data 242, may comprise a two-dimensional representation of an environment associated with a scenario, objects contained therein, and characteristics associated therewith, all of which may be part of a scenario associated with the log data. For example, the scenario data and/or modified scenario data 242 may identify a position of an object, an area occupied by the object, a velocity and/or acceleration associated with the object, whether the object is static or dynamic, an object type associated with the object (e.g., a classification such as "pedestrian," "bicyclist," "vehicle," "oversized vehicle," "traffic light," "traffic signage," "building," "roadway," "crosswalk, "sidewalk"), and/or other kinematic qualities associated with the object and/or the object type (e.g., a friction coefficient, an elasticity, a malleability). As regards the environment itself, the scenario data may identify a topology of the environment, weather conditions associated with the environment, a lighting state (e.g. sunny, cloudy, night), a location of light sources, and/or the like. In some examples, topology, fixed object (e.g., buildings, trees, signage) locations and dimensions, and/or the like associated with the scenario data and/or modified scenario data 242 may be generated based at least in part on map(s). In some examples, the scenario data may be used (e.g., by the simulation component 236 and/or the teleoperation component 244) to instantiate a three-dimensional representation of the object and/or the simulated environment may be instantiated based at least in part on map data (e.g., which may define a topology of the environment; the location and/or dimensions of fixtures such as signage, plants, and/or buildings) and/or the scenario data.

In some examples, a simulated sensor may determine sensor data based at least in part on a simulation executed by the simulation component 236. For example, U.S. patent application Ser. No. 16/581,632, filed Sep. 24, 2019 and incorporated herein, discusses this in more detail. In an additional or alternate example, the simulation executed by the simulation component may itself comprise simulated sensor data. The perception component 228 (e.g., a copy thereof, which may comprise software and/or hardware, which may include hardware-in-the loop simulation) may receive such sensor data and/or simulated sensor data may output perception data that is provided as input to the planning component 230. The planning component may use the perception data to determine instructions for controlling motion of the vehicle 202, which may be used to control at least the simulated representation of the vehicle 202 in the simulation and, in some examples, may be additionally used to control real-world motion of the vehicle 202, such as in examples wherein the simulation component 236 executes on-vehicle during real-world operation.

In some examples, a performance component 234 may determine a reward 246 (e.g., score) associated with how the vehicle 202 performed in the simulation (and/or in real-world operation, if the planning component's instructions are being used to control the vehicle 202 in real-world operation). In some examples, the reward 246 may be based at least in part on how close the vehicle 202 is to violating an operating constraint and/or how close the vehicle 202 is to an operating target (e.g., maintaining a heading and/or velocity, distance from a target path or position). In some examples, the reward 246 may be determined upon completion of at least a segment of the simulation, such as a time step (e.g., 10 milliseconds, 100 milliseconds, 500 milliseconds, 1 second, etc. of simulation or any other discretized portion of simulation, which may correspond go one or more computing cycles), or upon completion of the simulation (e.g., after the simulation completes up to a time horizon of simulation, such as two seconds in the future, five seconds in the future, or any other time; upon completion of a mission, such as by reaching a location, dropping off a passenger, or the like). In the latter example, the reward determined upon completion of the simulation may be a reward calculated for the entire simulation, which may include a sum total of rewards determined at time steps and/or an additional or alternate reward associated with the entire simulation. In some examples, the reward 246 may be based at least in part on a long-term score associated with mission-related or other long-range time window (e.g., 1-second interval, 2-second interval, 5-second interval, one-minute interval, thirty-minute interval) and/or a short-term score associated with near-term time window (e.g., 10 milliseconds, 100 milliseconds, 500 milliseconds) or short-term goals, such as adherence to a trajectory. The long-term and/or short-term scores may be based at least in part on goals (e.g., mission-level goals for the long-term score or short-term goal, such as completing a trajectory, for the short-term score), trajectories (e.g., which may be a short-term goal), and/or operating constraints. In other words, mission completion, trajectories, and/or operating constraints may be used as the targets for reinforcement learning and determining the reward as part of a reinforcement learning.

The reward 246 may be determined as part of reinforcement learning that is being used to train an ML component 248 of the vehicle 202. For example, the ML component 248 may be all or part of the localization component 226, perception component 228, and/or planning component 230. In at least one example, the ML component 248 may be all or part of the planning component 230—for example, the reward 246 may be determined based on or per action output by the planning component 230. In other words, in at least one example, the performance component 234 may determine the reward 246 for every one or more outputs of the planning component 230.

The adversarial agent component 238 may use the reward 246 to control simulated motion of a (simulated) dynamic object in the simulation determined by the simulation component 236. As discussed further herein, the adversarial agent component 238 may control motion of the dynamic object based at least in part on the reward 246 and subject to constraints 250—in particular, the adversarial agent component 238 may control the dynamic object in such a manner to reduce the reward 246 in a next time step and/or upon re-executing the simulation. In the latter example, multiple simulations corresponding with a same scenario may be run in parallel and/or sequentially. For example, the scenario modification component 240 may determine one or more modified scenarios, which may be the basis for a corresponding number of simulations. One or more of any of those scenarios may include a dynamic object that is controlled by the adversarial agent component 238. The adversarial agent component 238 may be trained to and/or modify control of the adversarial agent (i.e., the dynamic object under control of the adversarial agent component 238) to reduce the reward compared to rewards previously determined for a former time step or a former simulation, depending on what interval the reward(s) are determined.

Outputs of the simulation component 236 (e.g., such as a graphical representation of the simulation and/or a digest including details of how the simulation went, which may include whether the representation of the vehicle 202 violated an operating constraint or how near the vehicle 202 came to violating an operating constraint), adversarial agent component 238, and/or scenario modification component 240 may be provided to the teleoperation component 244. For example, any of these outputs may be used to determine a prospective scenario/event, which may comprise a prospective action of a dynamic object, a prospective arrangement of object(s) and/or a position of the vehicle 202 and/or any malleable attributes thereof, such as speed, heading, changeable state (e.g., blinker on, stopped, green light), etc.

The simulation component 236 may provide a safe and expeditious way of testing how the planning component 230 reacts to various scenarios that the vehicle 202 may or may not have encountered during operation, and determining whether or not the planning component 230 generates safe and/or efficacious control instructions to navigate the scenarios. Additionally or alternatively, the simulation component 236 may provide an additional or alternate manner of predicting object and/or environmental state(s), e.g., in addition to a nominal prediction component of the perception component 228.

In some examples, the simulation component 236 may additionally or alternatively store a ruleset and may determine whether the planning component 230 passed or failed a scenario based at least in part on the ruleset. The ruleset may be associated with and/or include operating constraint(s). In some examples, the simulation component 236 may record a version of the planning component 230 in association with a scenario identifier and/or an indication of whether the planning component 230 passed or failed. In an additional or alternate example, the simulation component 236 may determine a non-binary (e.g., continuous value) indication associated with performance of the planning component 230 (e.g., a score in addition to or instead of a pass/fail indication, such as the reward 246). The non-binary indication may be based at least in part on a set of weights associated with the ruleset. In some examples, the ruleset may be part of or replaced by an event detection system (U.S. patent application Ser. No. 16/682,971, filed Nov. 13, 2019, the entirety of which is incorporated herein) and/or a collision monitoring system (U.S. patent application Ser. No. 16/703,625, filed Dec. 4, 2019).

The memory 220 and/or 224 may additionally or alternatively store a mapping system, a planning system, a ride management system, etc. Although perception component 228, planning component 230, and/or performance component 234 are illustrated as being stored in memory 220 and/or 224, perception component 228, planning component 230, and/or performance component 234 may include processor-executable instructions, machine-learned model(s) (e.g., a neural network), and/or hardware.

As described herein, the localization component 226, the perception component 228, the planning component 230, performance component 234, the simulation component 236, adversarial agent component 238, and/or other components of the system 200 may comprise one or more ML models. For example, the localization component 226, the perception component 228, the planning component 230, performance component 234, the simulation component 236, and/or adversarial agent component 238 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 230 may generate instructions based at least in part on perception data generated by the perception component 228 and/or simulated perception data and transmit the instructions to the system controller(s), which may control operation of the vehicle 202 based at least in part on the instructions.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Adversarial Agent Control

Figure 3B:
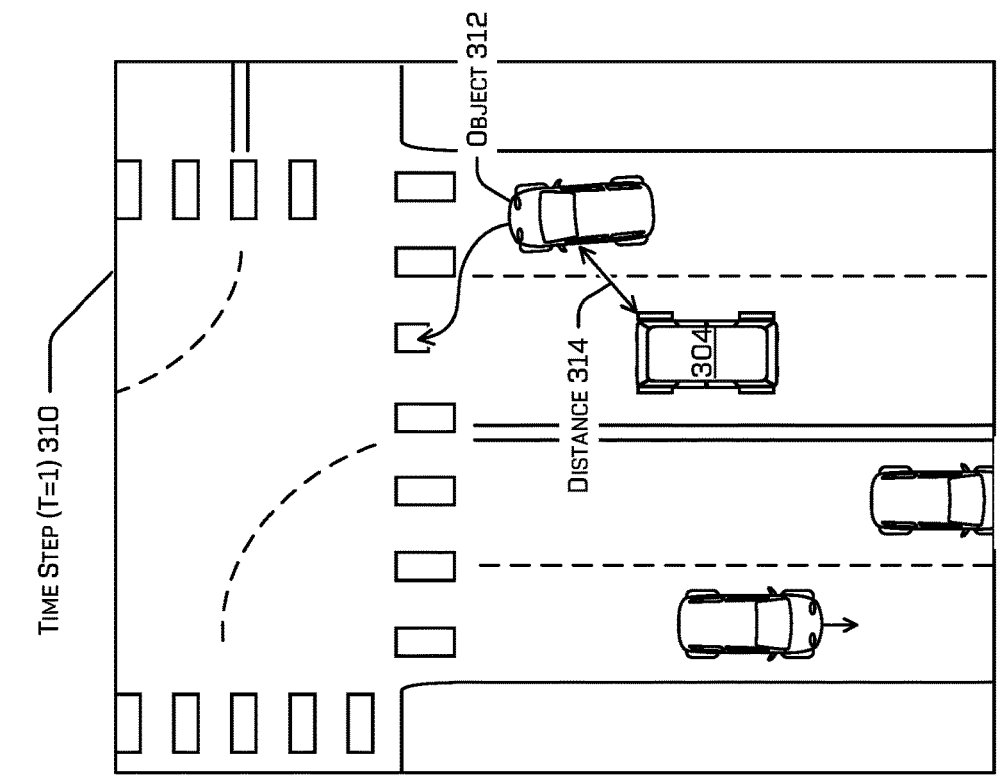
FIGS. 3A and 3B illustrate a top-down illustration of a first example simulation in which a dynamic object controlled by the adversarial agent component discussed herein makes a lane change.
Figure 3A:
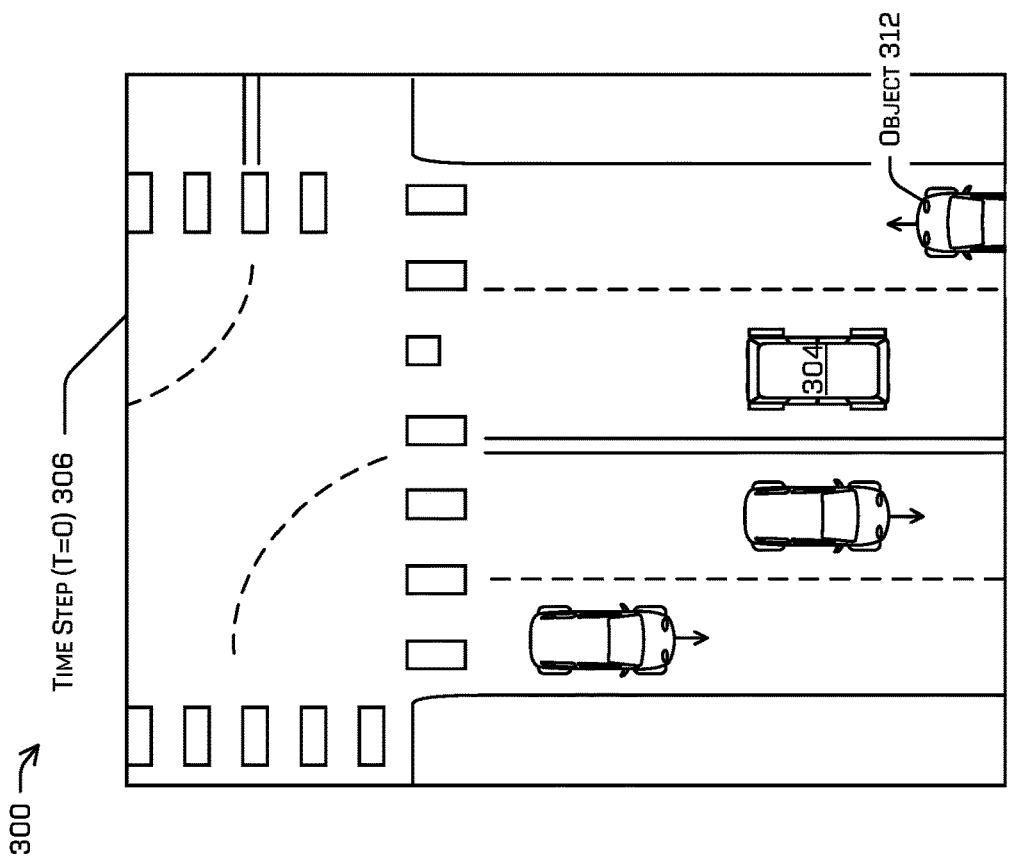
Figure 3D:
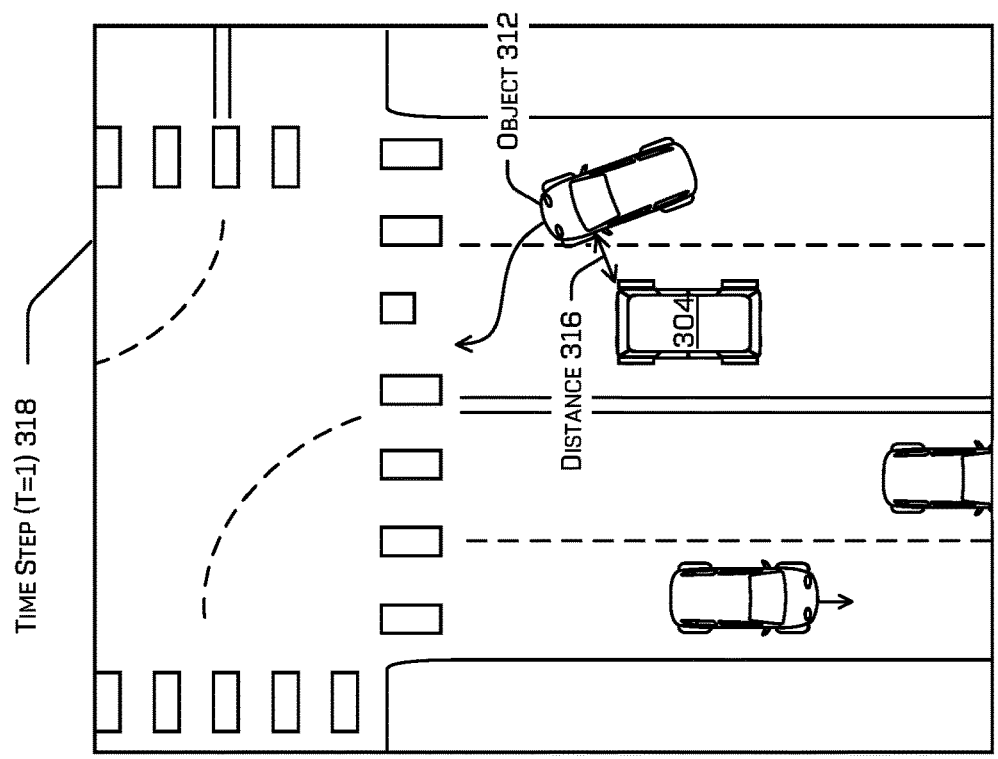
FIGS. 3C and 3D illustrate a top-down illustration of a second example simulation in which the adversarial agent component is modified based on a reward determined based on the performance of the autonomous vehicle, the modification to the adversarial agent component causing the dynamic object to take an action that may reduce the reward determined based on performance of the autonomous vehicle.
Figure 3C:
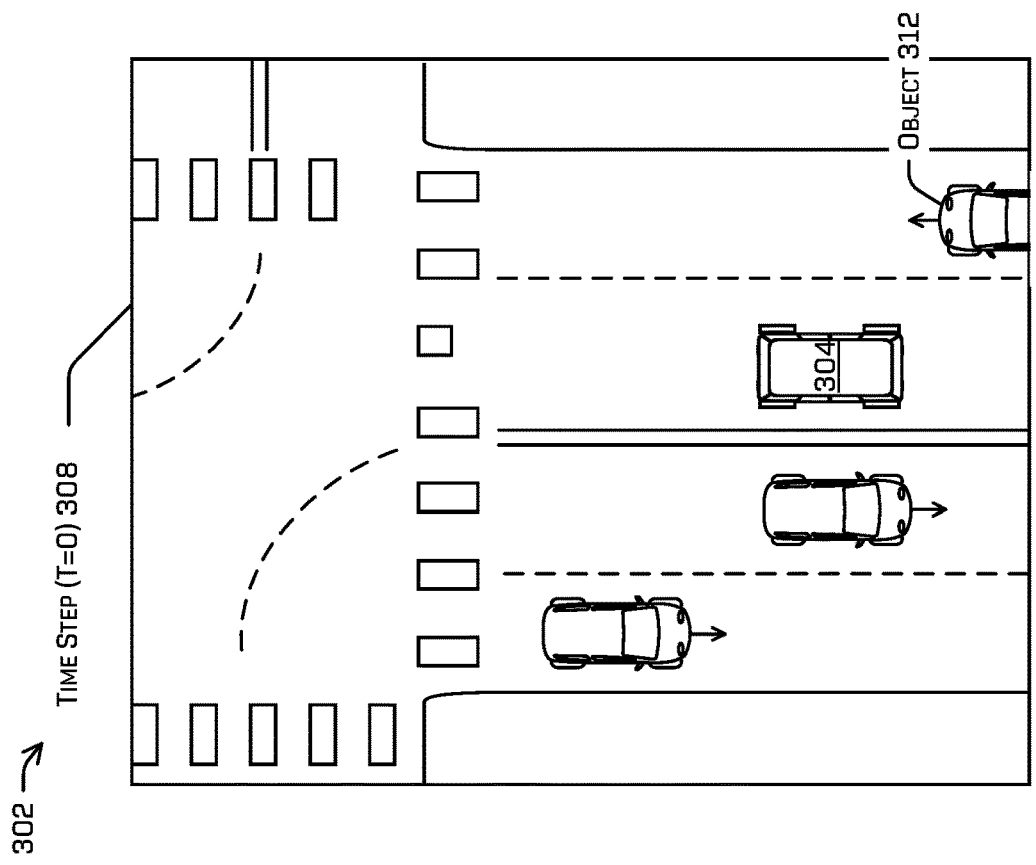

FIGS. 3A and 3B illustrate a simulated scenario 300 at two time steps where a dynamic object is controlled according to nominal operating instructions or during early training of the adversarial agent component. FIGS. 3C and 3D illustrate the same simulated scenario 302 (upon re-executing the simulation) but where the dynamic object is controlled by the adversarial agent component and/or where training the adversarial agent component has advanced further than the control exerted during simulated scenario 300 or the training of the adversarial agent component is complete or nearing completion. FIGS. 3A-3D are illustrated as top-down views of the simulation, although it is understood that the simulation may be executed as three-dimensional, two-dimensional, or other dimensional representation of the scenario, such as a wireframe model of the environment and objects therein.

FIGS. 3A and 3C illustrate a same initial scenario—both simulations start with a same configuration of the environment; number, type, placement, objective(s), etc. of the objects therein, etc. For example, the simulated autonomous vehicle 304 may be located at a same position and traveling at a same velocity at a first time step 306, t=0, in the simulated scenario 300 as in the simulated scenario 300 at a first time step 308, t=0. At the second time step 310, t=1, in simulated scenario 300, depicted at FIG. 3B, a dynamic object 312 may gradually change lanes in front of the simulated autonomous vehicle 304. One or more operating constraints may be used (e.g., by the performance component, which may be a deterministic or machine-learned component) to determine a reward associated with how the simulated autonomous vehicle 304 performed under the control of the planning component of the autonomous vehicle 304. In at least one example, the reward may be a machine-learning loss, such as a reinforcement learning reward or penalty.

To give an example and without limitation, the operating constraint(s) may include kinematic and/or qualitive metrics associated with operation of the vehicle, such as a minimum distance between the vehicle and a nearest object, an acceleration required to avoid impact, a time until impact, a deviation from a route, whether a jerk and/or acceleration by the vehicle met or exceeded a threshold jerk and/or a threshold acceleration, a predicted likelihood of impact, etc. The operating constraint(s) may additionally or alternatively comprise weights associated with different minimum distances that may be used to reduce the reward or boost the reward based at least in part on the minimum distance that the simulated autonomous vehicle 304 came from any object during the simulation. For example, the nearest the simulated autonomous vehicle 304 came to any other object may be depicted in FIG. 3B as distance 314. In the illustrated example, the performance component may determine not to apply a penalty to the reward because the distance 314 may be greater than a threshold distance specified by the operating constraint(s). It is understood that the operating constraint(s) may include any of a number of thresholds, weight (s), or the like associated with metric(s) indicating the safety and efficacy of the performance of the simulated autonomous vehicle 304, such as, for example, a minimum distance between the vehicle and a nearest object, an acceleration required to avoid impact, a time until impact, a deviation from a route, whether a jerk and/or acceleration by the vehicle met or exceeded a threshold jerk and/or a threshold acceleration, etc. The reward determined by the performance component may be based on any of these metrics and/or how close any of the metrics are to violating an operating constraint (e.g., meeting or exceeding a threshold, reaching a metric associated with a specified penalty).

FIG. 3C illustrates a same initial scenario as illustrated in FIG. 3A at a first time step 308 of the simulated scenario 302. However, in contrast to simulated scenario 300, the dynamic object 312 is being controlled by the adversarial agent component or a further trained version of the adversarial agent component in simulated scenario 302. In at least one example, the adversarial agent component may use the reward determined for the simulated autonomous vehicle 304 for the simulated scenario 302 to modify the instructions of the adversarial agent component to reduce that reward upon simulating scenario 302. This may cause the dynamic object 312 to be more aggressive in the simulated scenario 302, resulting in the closest the simulated autonomous vehicle 304 came to another object distance (i.e., distance 316 in simulated scenario 302) being reduced compared to the closest distance 314 in the simulated scenario 302 at a second time step 318 in the simulated scenario 302. This reduction in the minimum distance may cause the performance component to determine a reward for the performance of simulated autonomous vehicle 304 during simulated scenario 302 that is less than the reward for the performance of simulated autonomous vehicle 304 during simulated scenario 300.

Note that, although the techniques may comprise modifying the adversarial agent component to control the dynamic object differently between re-executions of a simulation of a same scenario, the techniques may additionally or alternatively include receiving a reward determined by the performance component for performance of the simulated autonomous vehicle 304 during a last time step at the adversarial agent component. The adversarial agent component may use this reward or an average of rewards determined during the simulation to control the dynamic object with the goal of minimizing the reward in a current or next time step. In some examples, the adversarial agent component may comprise an optimization algorithm and/or reinforcement learning algorithm that modifies behavior of the dynamic object 312 subject to a set of constraints. For example, the set of constraints may define an amount of time after instantiation of the simulated scenario that the dynamic object 312 may be controlled by the adversarial agent component, a maximum velocity and/or acceleration, turning yaw rate, a permitted maneuver or proscribed maneuver, and/or the like to prevent the adversarial agent component from controlling the dynamic object 312 in an impossibly difficult manner for the autonomous vehicle components to handle.

Example Scenario Modification

Figure 4B:
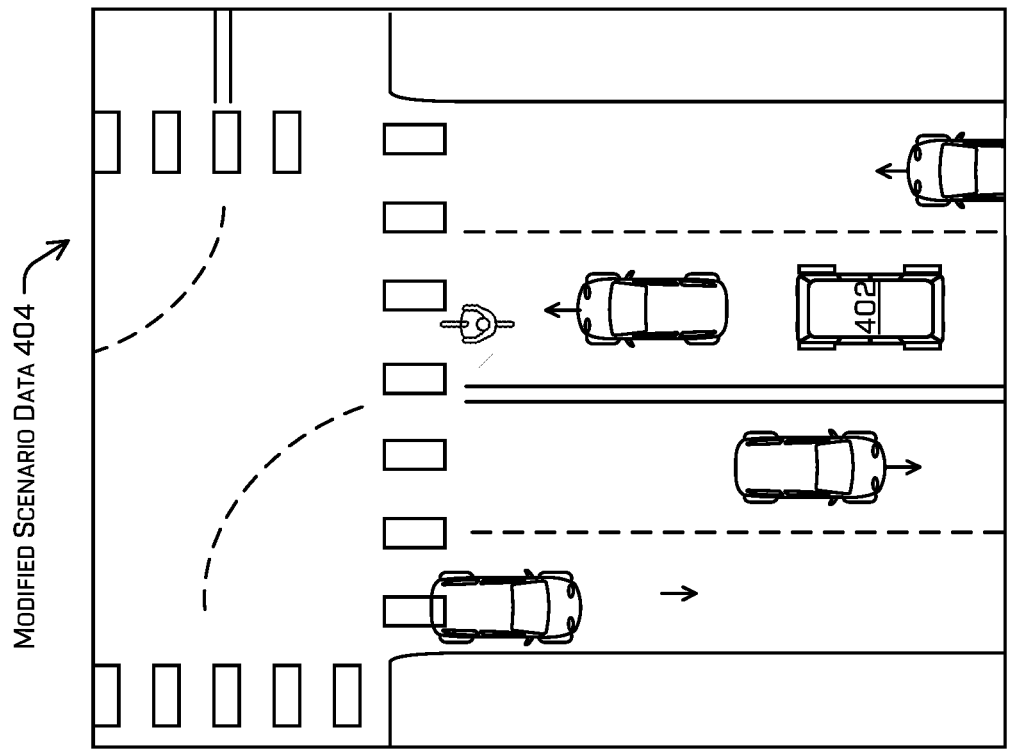
FIG. 4B illustrates a top-down illustration of second scenario data determined by modifying the first scenario data to reduce a reward determined based on performance of the autonomous vehicle.
Figure 4A:
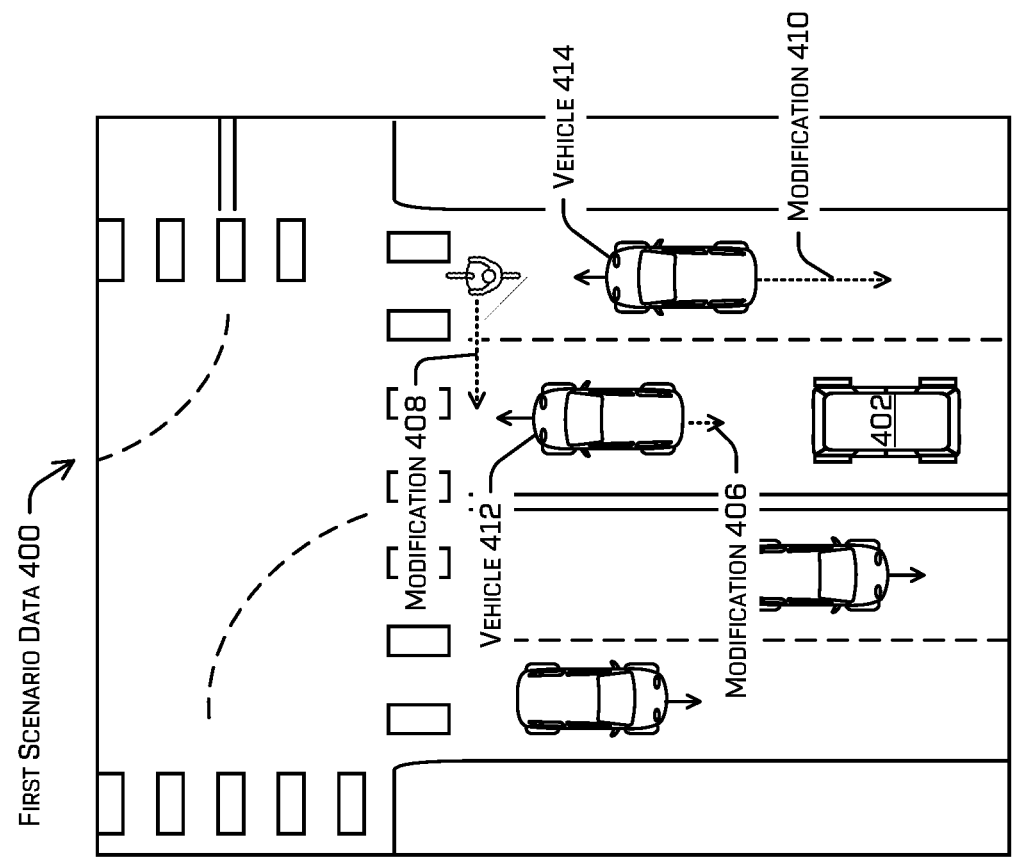
FIG. 4A illustrates a top-down illustration of first scenario data, including an environment layout and multiple dynamic objects.

FIG. 4A illustrates a top-down illustration of first scenario data 400, including an environment layout and multiple dynamic objects relative to a simulated autonomous vehicle 402. In some examples, the first scenario data 400 may be determined based at least in part on log data and/or user input. For example, a machine-learned component may cluster log data associated with same or similar arrangements and/or states of the environment and/or object(s) associated with the vehicle and this clustered log data may be used to generate a descriptor of the cluster. The descriptor may be a file defining general properties of similar log data and may be used to generate scenario data. The scenario data itself may comprise a scenario data file used to instantiate the scenario and/or for identifying how object(s) behave during the simulation, other than object(s) controlled by the adversarial agent component. For example, the scenario data file may comprise an indication of the environment layout (e.g., roadway directions of travel; existence and location of specialty lane; existence and location of signage/junction control; existence, number, and location of lanes/junctions); the existence, location, and/or static object(s) in the environment; and the number, classification, position, orientation, and/or velocity of dynamic object(s) in the environment. User input may additionally or alternatively make modifications to the descriptor and/or to instantiation of the simulation based on the scenario data file. Regardless of how the first scenario data 400 is generated, the first scenario data 400 may be modified according to the techniques discussed herein, which may result in the modified scenario data 404 depicted in FIG. 4B.

FIG. 4B illustrates a top-down illustration of modified scenario data 404 determined by modifying the first scenario data to reduce a reward determined for performance of the simulated autonomous vehicle 402. For example, modifications 406-410 may be applied to the first scenario data 400 based at least in part on determining that modifications 406-410 would reduce the reward determined for performance of the simulated autonomous vehicle 402 during a simulation executed using the first scenario data 400. Modification 406 may include moving a simulated vehicle 412 closer to the simulated autonomous vehicle 402. Modification 408 may include moving a simulated cyclist into a position hidden by vehicle 412. Modification 410 may comprise moving simulated vehicle 414 into a what would be a human's blind spot of the autonomous vehicle. Other modifications to the scenario data may include modifying a shape of the roadway, the presence or absence of traffic control, etc.

Example Process(es)

Figure 5:
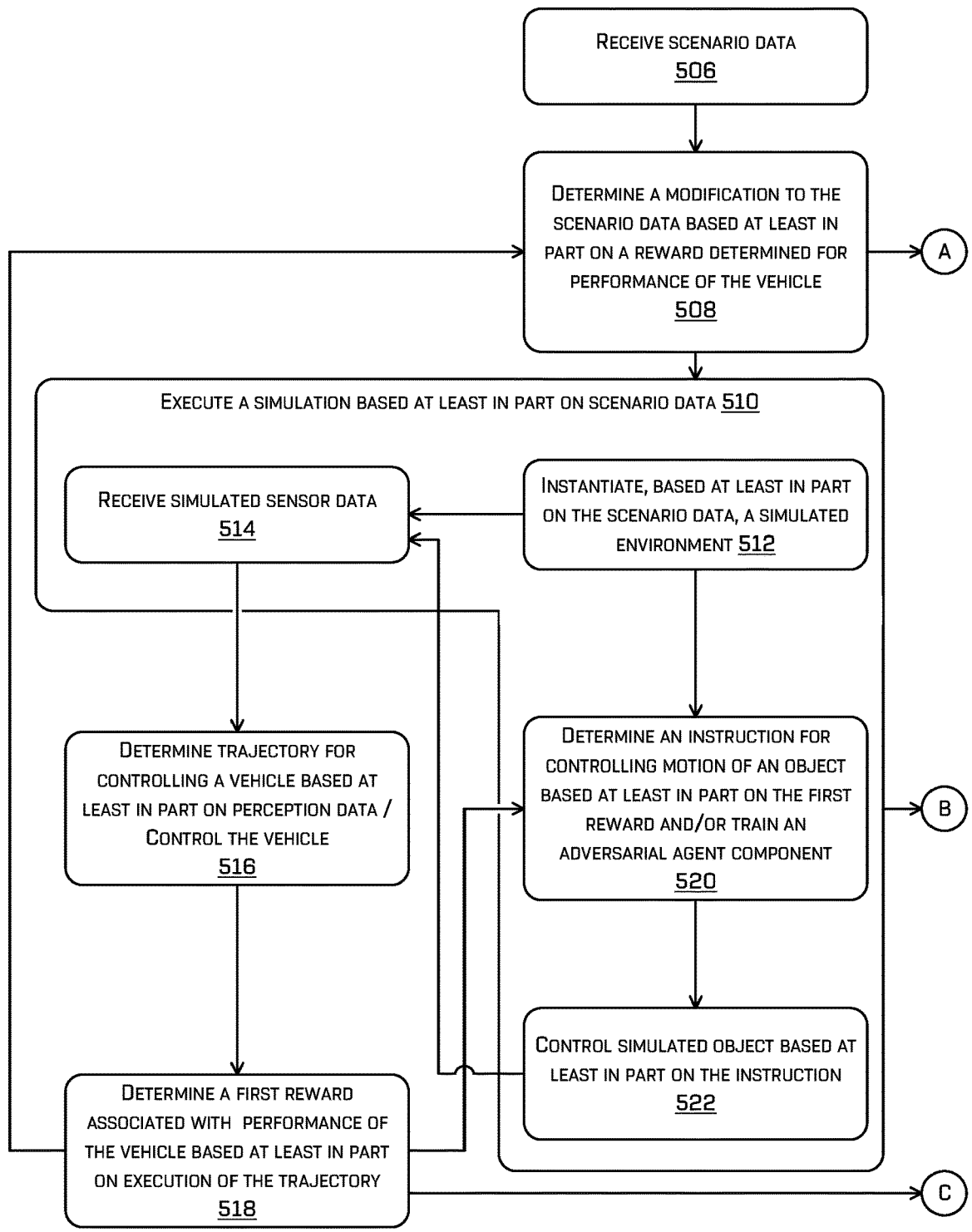
FIG. 5 illustrates a flow diagram of an example process for generating an adversarial agent component, modifying scenario data, and simulating motion of a dynamic object in a simulated environment using the adversarial agent component and/or modified scenario data.

FIG. 5 illustrates a flow diagram of an example process 500 for generating and/or using an adversarial agent component, modifying scenario data, and/simulating motion of a dynamic object in a simulated environment using the adversarial agent component and/or modified scenario data. In some examples, example process 500 may be accomplished by one or more components of an autonomous vehicle related to controlling the autonomous vehicle, such as the planning component discussed herein. Operations that may be executed by such components are illustrated under the heading autonomous vehicle control component(s) 502 on the left-hand side of the illustration. The autonomous vehicle control component(s) 502 may be on vehicle or replicated off-vehicle in some instances.

Additionally or alternatively, example process 500 may be accomplished by one or more components of a simulation component 504. The simulation component 504 may include hardware and/or software that are part of the autonomous vehicle or may be separate from the vehicle. Whether the simulation component 504 or a portion thereof is part of the autonomous vehicle and/or executes on the autonomous vehicle depends on whether example process 500 or at least a portion thereof is being executed on-vehicle, as opposed to offline or remote execution, such as for testing and developing the vehicle, as opposed to improving a planning component's prediction or the usefulness of the options and actions presented via a teleoperation component.

In some examples, the autonomous vehicle control component(s) 502 may include hardware and/or software of the autonomous vehicle and the simulation component 504 may include hardware and/or software located at and/or executing on the autonomous vehicle to improve object prediction and autonomous vehicle planning. In a second example, the autonomous vehicle control component(s) 502 may include hardware and/or software located at and/or executing on the autonomous vehicle and the simulation component 504 may include hardware and/or software located and/or executed at a teleoperations device that has received a request for assistance from the autonomous vehicle. Although, in an additional or alternate version of the second example, the simulation component 504 may be executed, at least partially, on the autonomous vehicle, and simulation results may be transmitted to the teleoperations device. In a third example, the autonomous vehicle control component(s) 502 may include hardware and/or software hardware and/or software located at and/or executing on the autonomous vehicle or replicated at a remote computing device and the simulation component 504 may include hardware and/or software located at and/or executing on a remote computing device, such as for testing and/or developing the autonomous vehicle. Other combinations are contemplated, and the examples given above are non-limiting. In some examples, example process 500 may be conducted by computing device(s) 214 and/or one or more components of the vehicle 202.

At operation 506, example process 500 may comprise receiving scenario data, according to any of the techniques discussed herein. For example, a simple simulation component may generate the scenario data. In an addition or alternate data, the scenario data may comprise sensor data, scenario instructions, and/or a scenario data structure. In some examples, the scenario data structure may comprise a position, orientation, and/or characteristics of static object(s), dynamic object(s), and/or the simulated vehicle in the environment, which may correspond to real-time operation of an autonomous vehicle and/or may correspond to simulated operation of the autonomous vehicle. In some examples, a planning component of the autonomous vehicle may generate instructions for controlling the simulated vehicle in an agnostic manner to the simulation (e.g., the instructions generated by the planning component may be the same as those generated for a similar real-world situation). The operation of the planning component may be tested in this manner. In some examples, a component may translate instructions generated by the planning component to instructions for controlling the simulated vehicle in the simulated environment (e.g., updating a simulated state associated with the simulated vehicle, which may comprise a position, orientation, velocity, acceleration, heading, and/or the like associated with the simulated vehicle).

The scenario data may additionally or alternatively comprise an indication of an object type associated with one or more objects and/or characteristics associated with the one or more objects (e.g., a position, velocity, acceleration, heading, material type, kinematic coefficient). Any of the data discussed herein may be part of the scenario data structure associated with a portion of log data. The scenario data structure may comprise a two-dimensional image, a publish-subscribe message, and/or the like.

In some examples, the perception component may additionally or alternatively determine scenario data as the vehicle operates during real-world operation, such as to generate scenario data for later use or for determining prediction data in addition to or instead of predictions made by the nominal prediction component(s) of the planning component of the vehicle. For example, the perception component may generate a scenario data structure comprising at least part of the perception data. The data structure may indicate a layout of the environment and/or a number, type, or configuration of the objects in the environment, etc. The scenario data may then be used to instantiate the simulation (at the vehicle or off the vehicle, as discussed above). In some examples, prediction data generated by the perception component may be used to control motion of any dynamic object(s) in the simulation that aren't controlled by an adversarial agent component. The perception data (which may comprise prediction data) and/or the scenario data structure may be associated with and/or added to the log data.

In examples where the prediction component determines scenario data based at least in part on perception data for simulation on the vehicle during real-world operation, the simulation component may output an alternate prediction (e.g., an alternate predicted maneuver/path) associated with an object. In an additional or alternate example, example process 500 may be executed by the simulation component in a fully or partially synthetic scenario, where the scenario is fully generated based at least in part on scenario instructions or partially using sensor data, respectively. The synthetic scenario may be executed in real or synthetic time. For example, a partially synthetic scenario may generate the scenario data based at least in part on real-time sensor data or based on log data.

At operation 508, example process 500 may comprise determining a modification to the scenario data based at least in part on a reward determined for performance of the vehicle, according to any of the techniques discussed herein. In some examples, operation 508 may be skipped, such as during a first simulation using first scenario data. In other words, after a simulation is completed, the simulation may be repeated a second time using a modified version of the first scenario data, as modified according to operation 508. Regardless, a reward determined in association with how the (simulated or real-world) vehicle performed may be used to determine a modification to the scenario data that would reduce the reward upon repetition of the simulation using the modified scenario data or is predicted to reduce the reward. In some examples, operation 508 may comprise determining the modification based at least in part on using a neural network or other ML model to determine the modification and a confidence score associated with the modification, where the confidence score indicates a likelihood (e.g., a posterior probability) that the modification will decrease the reward. The ML model may be trained to modify the "environment" component of a reinforcement learning algorithm that is training a component of the vehicle, such as the planning component of the vehicle, or at least determining a reward associated with operation of the vehicle to quantify performance of the vehicle. Such modification may comprise altering any state or condition that would be malleable in practice, such as object position, heading, velocity, general behavior characteristics (e.g., aggressive, conservative, paying minimal or low attention), although in some examples, the modification may additionally or alternatively comprise altering a state or condition to increase the difficulty of the simulation, such as the shape of the roadway, the presence of static objects that obstruct sightlines, etc. In some examples, the modification may comprise altering an initial condition of dynamic object(s) in the scene, such as starting position, heading, velocity, etc.

In some examples, operation 508 may be used to mine hard examples from a library of scenario data and/or operation 508 may be used to iteratively make subsequent simulations more and more difficult until the simulated vehicle violates an operating constraint. Regardless, the modified scenario data may be stored and/or used to instantiate a simulation.

In some examples, operation 508 may comprise determining a region of a scenario parameter space associated with a reward that is below a threshold reward (e.g., such as a negative reward/penalty). Determining this region and the scenario data associated with the region may be based at least in part on the techniques discussed in further detail in U.S. patent application Ser. No. 17/187,721, filed Feb. 26, 2021, the entirety of which is incorporated by reference herein for all intents and purposes. The description in U.S. patent application Ser. No. 17/187,721 may be modified to additionally determine the delineation of the parameter space additionally or alternatively based at least in part on the reward determined according to the discussion herein. Modifying the scenario data may include modifying the scenario data to increase a similarity between parameters indicated by the scenario data and parameters indicated by a closest set of scenario parameters classified as being adverse according to the techniques discussed in U.S. patent application Ser. No. 17/187,721 and/or being associated with a reward that is below a threshold. For example, parameter(s) of the scenario data may iteratively be changed to increase the similarity of the scenario data to the closet set of scenario parameters classified as being adverse and/or associated with a penalty/negative reward up until the sets of scenario parameters are equal or until the vehicle violates an operating constraint, whichever comes first.

At operation 510, example process 500 may comprise executing a simulation based at least in part on scenario data, according to any of the techniques discussed herein. Executing the simulation may be based at least in part on modified scenario data or unmodified scenario data (e.g., where operation 508 is skipped) and/or may include using an adversarial agent component, prediction data generated by the perception component, and/or scenario data instructions to control motion of dynamic objects in the simulation.

Operation 510 (executing the simulation based at least in part on the scenario data) may comprise operation(s) 512, 514, 520, and/or 522.

At operation 512, example process 500 may comprise instantiating, based at least in part on the scenario data, a simulated environment based at least in part on the scenario data, according to any of the techniques discussed herein. Operation 512 may comprise procedurally generating the simulated environment based at least in part on a set of template models associated with the object types identified in the scenario data. For example, the set of template models may comprise three different passenger vehicle models, four different pedestrian models, and/or the like. Any number of different models may exist. In some examples, a template model may comprise a three-dimensional model of a surface of an object without any texturing, although in additional or alternate examples, the model may comprise texture. Additionally or alternatively, operation 512 may comprise populating the simulated environment at least partially using perception data.

The template model may comprise a polygon mesh, a triangle mesh, and/or the like. In some examples, models associated with dynamic objects may have a higher polygon count than models associated with static objects. In some examples, the simulated environment may comprise surface models and lack lighting and/or textures. In additional or alternate examples, the simulated environment may comprise lighting and/or textures, but the techniques described herein work without lighting and/or textures. The simulated environment may comprise a model of the simulated vehicle. In some examples, instantiating the environment portion of the simulated environment may be based at least in part on log data, scenario data, and/or map data and objects in the environment may be based at least in part on instructions received as part of the scenario data (e.g., instructions generated based at least in part on user selection(s) and/or interaction with a user interface, procedurally-generated instructions).

At operation 514, example process 500 may comprise receiving simulated sensor data at a component of the autonomous vehicle, according to any of the techniques discussed herein. For example, the simulated sensor data may be generated based at least in part on a position, heading, etc. of the simulated vehicle in the simulation and a simulated location and orientation of simulated sensors associated with the simulated vehicle. In some examples, a simulated sensor may determine sensor data based at least in part on the simulation being executed. For example, U.S. patent application Ser. No. 16/581,632, filed Sep. 24, 2019 and incorporated herein, discusses this in more detail. In an additional or alternate example, the simulation executed by the simulation component may itself comprise simulated sensor data.

At operation 516, example process 500 may comprise determining a trajectory for controlling the vehicle based at least in part on perception data and/or controlling the vehicle using the trajectory, according to any of the techniques discussed herein. For example, the simulated sensor data (or real sensor data in some instances) may be provided to a perception component of the autonomous vehicle. The perception component may generate perception data used by the planning component to generate a trajectory, as discussed in more detail above. This trajectory may be translated by the simulation component to control motion of the simulated vehicle in the simulation. In instances where the simulation is running on-vehicle to improve the prediction and planning capabilities of the vehicle, the trajectory may be used to control motion of the vehicle in the real-world as well. In yet another example, the simulation may be associated with a future time, so the trajectory may not be implemented by the vehicle in the real-world at the same time that the trajectory is used to control the simulated vehicle. For example, hundreds, thousands, millions, or any other number of simulations may occur in the time between trajectory generation and implementation by the vehicle to improve the prediction data used to generate a trajectory for use by the vehicle.

At operation 518, example process 500 may comprise determining a first reward associated with performance of the vehicle based at least in part on execution of the trajectory, according to any of the techniques discussed herein. In some examples, the first reward may be positive or negative—the reward may be a punishment. The reward may be determined as part of an action-reward feedback loop of a reinforcement learning algorithm and may be determined per vehicle action (e.g., per trajectory), per a predetermined number of actions (e.g., one reward calculated per n number of actions taken by the vehicle, where n is a positive integer), and/or upon completion of the simulation (e.g., by reaching a time horizon in the simulation, by completing a scenario, by reaching a resolution such as a violation of the operating constraints or completing a mission). Determining the reward may be based at least in part on a set of rules, such as the operating constraints, and may be accomplished by an ML model trained to score performance of the vehicle. For example, the ML model may comprise a reward function that determines a score based at least in part on the operating constraints discussed herein. This reward may be used to modify scenario data at operation 508 and/or as a basis for controlling an adversarial agent by the adversarial agent component at operation(s) 520 and/or 522.

In some examples, the reward may be a weighted sum of sub-rewards. For example, the sub-rewards may be determined based at least in part on the operating constraint(s) (e.g., whether an operating constraint was violated, which may result in applying a penalty that overrides the weighted sum or a penalty that is part of the sum; whether the operating constraint(s) indicate that a near-miss occurred, as discussed in more detail in U.S. patent application Ser. No. 16/953,277, the entirety of which is incorporated herein by reference), generated by an ML model, and/or the like. In some examples, an ML model may be trained to receive a trajectory from a planning component of the vehicle and output a predicted likelihood that the trajectory will result in a near-miss or an impact, as discussed in more detail in Ser. No. 16/953,277. This likelihood may be used to determine a sub-reward. In one example, the ML model may output such a likelihood in association with a time in the future and may output multiple likelihoods, each associated with different future times. In such an instance, a reward determined based on one of these likelihoods may be associated with a weight —a set of weights associated with the sub-rewards generated from all the likelihoods may progressively downweight the likelihoods, the further the likelihoods are from a time associated with the trajectory (i.e., the further into the future the likelihoods are, as compared to a time associated with the trajectory's generation).

In an instance where an impact occurred in the simulation, the penalty for an impact may override any of the other rewards and a negative reward (e.g., a penalty) may be applied to the vehicle's component that is being trained (and a positive sub-reward may be applied to the adversarial agent, but this may be cancelled by a negative sub-reward applied to the adversarial agent component for the impact). In an additional or alternate example, a machine-learned model may receive simulation data (e.g., a record of the simulation, including the simulated impact) and may determine a severity of the impact, which may be used to determine a sub-reward. In some examples, this reward may be used in a weighted sum with other sub-rewards. For example, the impact may have been slight/de minimis (e.g., a bumper tap while parking, touching a curb)—such behavior should be penalized, but may not merit a penalty that overwhelms the other sub-rewards.

At operation 520, example process 500 may comprise determining an instruction for controlling motion of an object based at least in part on the first reward, according to any of the techniques discussed herein. In at least one example, executing the simulation may comprise controlling a simulated dynamic object in the simulation using instructions determined by the adversarial agent component. Simulated dynamic object(s) controlled by the adversarial agent component are referred to herein as adversarial agent(s). In some examples, operation 520 and 522 may be skipped in an instance where only scenario modification is being conducted although it is contemplated that both scenario modification and adversarial agent control may be used for a simulation.

The adversarial agent component may receive a reward associated with performance of the vehicle and may determine an instruction for controlling motion of an adversarial agent in the simulation such that the instruction reduces or is likely to reduce the reward. The frequency with which the instruction is updated may depend on the frequency with which the reward is determined, as discussed above. If the reward is determined per action of the vehicle, the instruction may be determined and/or at the same frequency or based on an average/window of rewards determined within a previous time window. For example, the adversarial agent component may control motion of the adversarial agent while the simulation progresses based on the reward calculated for the simulated vehicle as it moves in the simulation. Additionally or alternatively, determining the instruction may include determining an instruction for controlling the adversarial agent during a next simulation.

Regardless, the adversarial agent component may determine the instructions in a manner that reduces or that the adversarial agent component determines is likely to reduce the reward determined for performance of the simulated vehicle. For example, the adversarial agent component may comprise a second reinforcement learning algorithm including a reward function that rewards the adversarial agent component for actions that reduce the reward determined for the vehicle. In other words, the reward function for the adversarial agent may be configured to reduce or minimize the reward determined for the simulated vehicle. Moreover, the adversarial agent may comprise an ML model configured to control the adversarial agent in the simulation and that ML model may be modified based at least in part on the reward determined by the second reinforcement learning algorithm for performance of the adversarial agent.

For example, the adversarial agent component may comprise a neural network or another suitable ML model for selecting an action for controlling the adversarial agent, such as via classification. Training the adversarial agent may comprise determining a loss based at least in part on a loss function configured to penalize behavior that increases the reward determined for the vehicle (or, put conversely, rewards behavior by the adversarial agent that decreases the reward determined for the vehicle up until the constraints are met) and using gradient descent or another algorithm for tuning ML model of the adversarial agent component based at least in part on the loss. In some examples, the loss function may additionally or alternatively base the loss on additional goals besides reducing the reward determined in association with the vehicle, such as making progress along a route, conforming to comfort parameters (e.g., controlling the adversarial agent to move at accelerations at or below threshold lateral and/or longitudinal acceleration and/or jerk threshold(s)).

The instruction determined by the adversarial agent component may be confined by one or more adversarial agent constraints to prevent creating a scenario that is impossibly difficult. For example, the constraints may include limitations such as a maximum velocity, maximum acceleration, maximum yaw rate, a permitted maneuver, a proscribed maneuver, a minimum distance from the vehicle at the beginning of the simulation, a minimum time after instantiation of the simulation that the adversarial agent component may control the adversarial agent (before which the dynamic object may be controlled according to scenario data and/or prediction data), and/or the like. In at least one example, determining the instruction may be based at least in part on determining a score or reward associated with how the adversarial agent is being controlled by the adversarial agent component. The score/reward may be based at least in part on the operating constraints associated with the vehicle, only the score/reward determined for the adversarial agent may be inverted compared to the reward determined for the vehicle; i.e., the reward determined for the adversarial agent may increase the closer the adversarial agent gets to violating the operating constraints, as relates to the simulated vehicle. For example, the closer the adversarial agent gets to the simulated vehicle or if the adversarial agent is able to violate one of the operating constraints when the simulated vehicle is the closest vehicle, the reward may be increased for the adversarial agent. This may cause the adversarial agent to collide with the simulated vehicle, pass within a narrow distance of the vehicle, brake hard in front of the vehicle, or the like.

At operation 522, example process 500 may comprise controlling the simulated object (i.e., the adversarial agent) based at least in part on the instruction, according to any of the techniques discussed herein. Operation 522 may comprise controlling the simulated motion of the adversarial agent in the simulation, which may affect the simulated sensor data received by a component of the vehicle.

In some examples, operation 508 and/or 520 may be used to determine a prospective scenario that may increase the likelihood of the vehicle and/or simulated vehicle violating an operating constraint. Additionally or alternatively, operation 518 may be used as part of training for one or more components of the vehicle.

Figure 6:
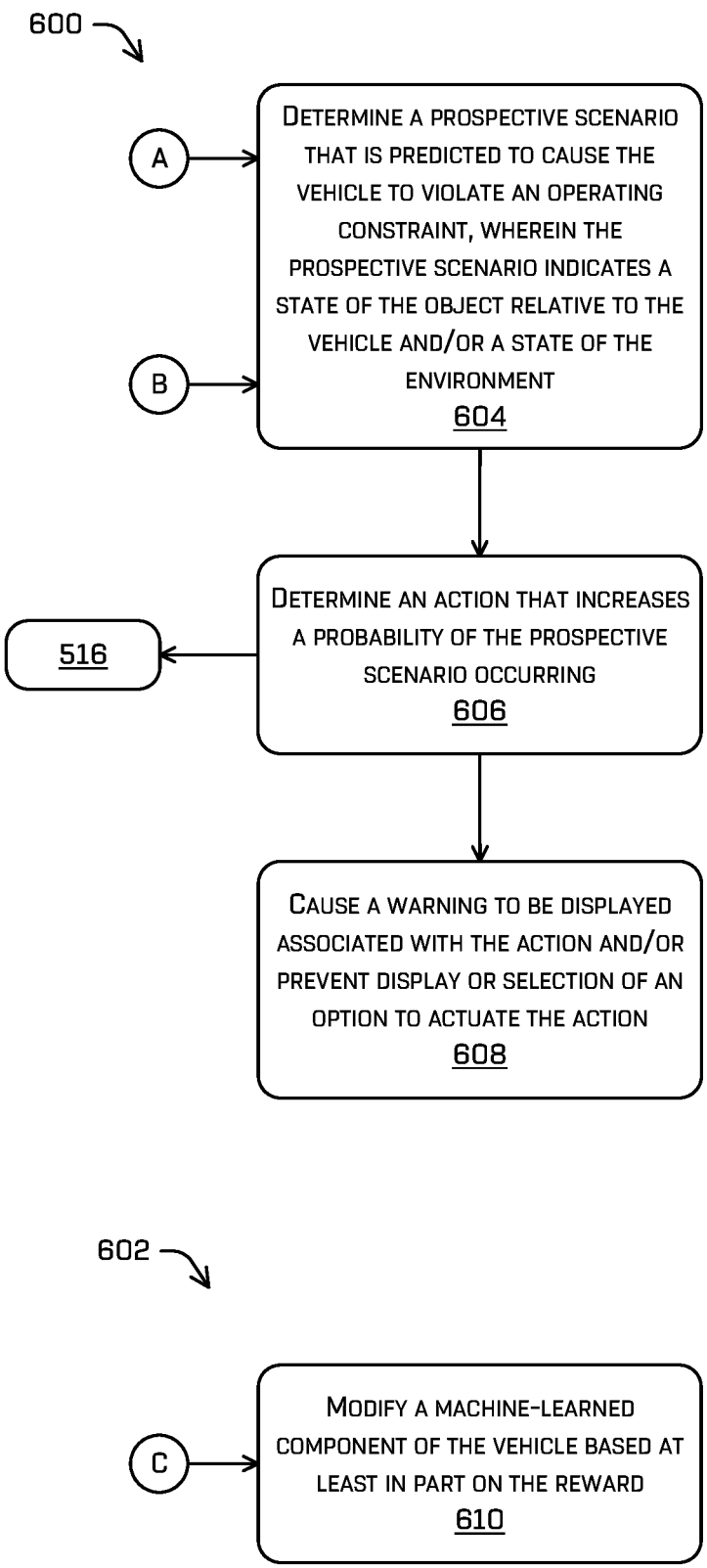
FIG. 6 illustrates flow diagrams of example process(es) and/or operations that may be based at least in part on the adversarial agent component and/or modified scenario data, including training a component of the autonomous vehicle and/or identifying prospective action(s) and/or scenario(s) that may increase a likelihood of occurrence of the autonomous vehicle violating an operating constraint.

FIG. 6 illustrates flow diagrams of example process(es) and/or operations that may be based at least in part on the adversarial agent component and/or modified scenario data, including training a component of the autonomous vehicle and/or identifying prospective action(s) and/or scenario(s) that may increase a likelihood of occurrence of the autonomous vehicle violating an operating constraint. Example process 600 may be executed by a prediction component of the planning component of the vehicle and/or the simulation component, or example process 600 may be executed at a remote computing device, such as a teleoperations device or a remote computing device that is used for testing and/or development of components of the vehicle. Example process 602 may be executed at a remote computing device for use in testing and/or development of the vehicle, although it is also contemplated that training could additionally or alternatively occur on the vehicle.

At operation 604, example process 600 may comprise determining a prospective scenario that may be predicted to cause the vehicle (and/or simulated vehicle) to violate an operating constraint, wherein the prospective scenario/event indicates a state of the object relative to the vehicle and/or a state of the environment, according to any of the techniques discussed herein. For example, example process 500 may comprise iteratively executing one or more simulations, which may include modifying scenario data and/or modifying how an adversarial agent behaves. Operation 604 may comprise identifying which, if any of the simulations, resulted in a violation of an operating constraint and/or which simulation came closest to violating an operating constraint during simulation. In an additional or alternate example, operation 604 may comprise determining that operating the vehicle and/or simulated vehicle resulted in a near-miss, as discussed in more detail in U.S. patent application Ser. No. 16/953,277. Any such simulations may be identified as a prospective scenario that may increase a likelihood of the vehicle and/or simulated vehicle violating an operating constraint. In some examples, the prospective scenario may include a prospective action that an object may take that is based at least in part on an action exhibited by the adversarial agent. Additionally or alternatively, any scenario data classified as an adverse event, according to U.S. patent application Ser. No. 17/187,721, may be identified as the prospective scenario that may increase a likelihood the vehicle and/or simulated vehicle will violate an operating constraint.

The prospective scenario and/or the prospective action may be incorporated as part of the prediction data generated by the perception component and may be used to determine a trajectory for controlling the vehicle and/or the simulated vehicle (e.g., to avoid the prospective scenario and/or the prospective action). In some examples, a prediction component of the perception component may determine a probability associated with the prospective scenario and/or a probability associated with the prospective action, either or both of which may indicate a probability that the scenario or action will occur. Determining the probability may be based at least in part on a number of modifications and/or a magnitude of modification(s) made to scenario data; and/or a maximum speed/acceleration/yaw rate of, number of operating constraint(s) violated by, number and/or magnitude of modifications made to, etc. the adversarial agent before the simulated vehicle violated an operating constraint or came close to violating an operating constraint. In some examples, the probability determined may not be all that likely, in practice, but the prospective scenario and/or prospective action may be used to identify a "worst-case scenario" or a top m number of negative scenarios for the vehicle, where m is a positive integer. The prospective scenarios and/or prospective actions may be ranked according to the probabilities associated therewith, number and/or extent of violations of an operating constraint, and/or proximity to violating an operating constraint.

At operation 606, example process 600 may comprise determining an action (by the vehicle) that increase a probability of the prospective scenario occurring, according to any of the techniques discussed herein. In some examples, operation 606 may be skipped and example process 600 may proceed to operation 516 and/or to operation 608. Additionally or alternatively, operation 606 may include determining an action by the vehicle that increases a probability of the prospective scenario occurring, which may include executing one or more simulations according to example process 500 and controlling the simulated vehicle differently in each simulation. In order to increase the diversity of the actions attempted by the vehicle, the simulations may be divided into a first stage where the prospective scenario and/or prospective action is identified and the planning component operates nominally and a second stage where the planning component is forced to take different actions in subsequent simulations where the scenario data is held constant (e.g., the worst-case scenario data, in at least one example; or iteratively testing and holding constant different ones of the m worst-case scenarios). If any action taken by the vehicle results in avoiding the prospective scenario and/or prospective action and does not violate an operating constraint, that action is identified in operation 606. Inversely, qualities of the prospective scenario may be used to determine locations and/or operations that would increase a likelihood of the scenario occurring (e.g., getting too close to an object, turning at a particular point relative to another object).

Operation 606 may transition to operation 516, where the vehicle may determine a trajectory for controlling the vehicle and/or simulated vehicle based at least in part on the prospective scenario, prospective action, and/or the vehicle action that increases or decreases the likelihood of the prospective scenario and/or prospective action occurring.

Operation 606 may additionally or alternatively transition to operation 608. Operation 608 may comprise causing a warning to be displayed associated with the action that increases a probability of the prospective scenario and/or prospective action occurring, and/or displaying an identification of the prospective scenario and/or prospective action. Additionally or alternatively, operation 608 may prevent display and/or selection of an option to cause the action to be accomplished by the vehicle. For example, a teleoperations device may gray out or prevent from being displayed an option that would cause the action that increases the probability of the prospective scenario and/or prospective action occurring, or a planning component may remove such an action from a list of possible actions for selection by the planning component.

Example process 602 may comprise operation 610. Operation 610 may comprise modifying an ML component of the vehicle based at least in part on the first reward determined at operation 518. For example, operation 610 may be part of a reinforcement learning algorithm or may be used as part of another ML training technique. Regardless, the ML component may include, for example, the perception component (and/or a prediction component thereof), the planning component, the performance component, a portion of the simulation component, and/or the like.

Example Clauses

A. A method comprising: receiving scenario data indicating a type of object and an object position relative to an environment and a vehicle; generating a simulation based at least in part on the scenario data; determining a first reward associated with performance of the vehicle in the simulation over a first period of time; determining a modification to the scenario data based at least in part on the first reward, wherein the modification alters the scenario data such that a subsequent reward determined in association with operation of the vehicle over a second time is less than the first reward; determining an instruction for controlling motion of the object based at least in part on the first reward, wherein the instruction causes the object to take an action such that the subsequent reward is less than the first reward; and executing a simulation based at least in part on the modification to the scenario data, wherein executing the simulation comprises controlling motion of the object in a simulated environment based at least in part on the instruction.

B. The method of paragraph A, wherein determining the first reward comprises: determining a first sub-reward based at least in part on whether performance of the vehicle conformed an operating constraint specifying a threshold characteristic for operation of the vehicle; determining a second sub-reward based at least in part on an output determined by a machine-learned model based at least in part on the performance of the vehicle, the output indicating a likelihood that a simulated representation of the vehicle will impact a second object; and determining, via a weighted sum, the first reward based at least in part on the first sub-reward and the second sub-reward.

C. The method of either paragraph A or B, wherein: determining the instruction for controlling motion of the object comprises training a machine-learned model for controlling motion of the object in the simulated environment; training the machine-learned model comprises altering the machine-learned model to decrease the first reward; and altering the machine-learned model is limited by one or more constraints associated with controlling at least one of position or motion of the object.

D. The method of any one of paragraphs A-C, wherein: the performance of the vehicle is a real-world performance; the scenario data is determined based at least in part on sensor data received in association with the vehicle and the environment; and the method further comprises determining, based at least in part on the modification, the simulation, and the instruction, a prospective scenario that is predicted to cause the vehicle to violate an operating constraint, wherein the prospective scenario indicates a state of the object relative to the vehicle and a state of the environment.

E. The method of paragraph D, wherein: determining the modification, determining the instruction, and executing the simulation are executed by a remote device; and the method further comprises at least one of: determining an action that increases a likelihood of the prospective scenario occurring; causing a warning to be displayed via a teleoperations device in association with a teleoperations option that causes the action to occur or that causes the vehicle to include the action as an option for controlling the vehicle; or preventing the teleoperations option from being at least one of input or displayed.

F. The method of any one of paragraphs A-E, wherein the performance of the vehicle, the object, and the environment are simulated; and the method further comprises: modifying a machine-learned component of the vehicle based at least in part on determining a third reward associated with performance of the vehicle over a third time period during execution of the simulation; and transmitting the machine-learned component to a real-world vehicle, wherein operation of the real-world vehicle is based at least in part on executing the component. x. The method of paragraph A, wherein the modification is further based at least in part on reducing at least one of an average reward or a total reward determined in association with the vehicle during two or more iterations of performance by the vehicle.

G. A system comprising: one or more processors; and a memory storing processor-executable instructions that, when executed by the one or more processors, cause the system to perform operations comprising: receiving scenario data; generating a simulation based at least in part on the scenario data; determining a first reward associated with performance of the vehicle in the simulation over a first period of time; determining a modification to the scenario data based at least in part on the first reward, wherein the modification alters the scenario data such that a subsequent reward determined in association with operation of the vehicle over a second time is less than the first reward; determining an instruction for controlling motion of the object based at least in part on the first reward, wherein the instruction causes the object to take an action such that the subsequent reward is less than the first reward; and executing a simulation based at least in part on the modification to the scenario data, wherein executing the simulation comprises controlling motion of the object in a simulated environment based at least in part on the instruction.

H. The system of paragraph G, wherein the operations further comprise: receiving sensor data associated with the vehicle; determining the scenario data based at least in part on the sensor data; determining an event that is predicted to cause the vehicle to violate an operating constraint; and controlling the vehicle to avoid actions that increase a likelihood of occurrence of the event.

I. The system of either paragraph G or H, wherein determining the first reward comprises: determining a first sub-reward based at least in part on whether performance of the vehicle conformed an operating constraint specifying a threshold characteristic for operation of the vehicle; determining a second sub-reward based at least in part on an output determined by a machine-learned model based at least in part on the performance of the vehicle, the output indicating a likelihood that a simulated representation of the vehicle will impact a second object; and determining, via a weighted sum, the first reward based at least in part on the first sub-reward and the second sub-reward.

J. The system of any one of paragraphs G-I, wherein: determining the instruction for controlling motion of the object comprises training a machine-learned model for controlling motion of the object in the simulated environment; training the machine-learned model comprises altering the machine-learned model to decrease the first reward; and altering the machine-learned model is limited by one or more constraints associated with controlling at least one of position or motion of the object.

K. The system of any one of paragraphs G-J, wherein: the performance of the vehicle is a real-world performance; the scenario data is determined based at least in part on sensor data received in association with the vehicle and the environment; and the operations further comprise determining, based at least in part on the modification, the simulation, and the instruction, an event that is predicted to cause the vehicle to violate an operating constraint, wherein the event indicates a state of the object relative to the vehicle and a state of the environment.

L. The system of paragraph K, wherein: determining the modification, determining the instruction, and executing the simulation are executed by a remote device; and the operations further comprise at least one of: determining an action that increases a likelihood of the event occurring; causing a warning to be displayed via a teleoperations device in association with a teleoperations option that causes the action to occur or that causes the vehicle to include the action as an option for controlling the vehicle; or preventing the teleoperations option from being at least one of input or displayed.

M. The system of any one of paragraphs G-L, wherein the performance of the vehicle, the object, and the environment are simulated; and the operations further comprise: modifying a machine-learned component of the vehicle based at least in part on determining a third reward associated with performance of the vehicle over a third time period during execution of the simulation; and transmitting the machine-learned component to a real-world vehicle, wherein operation of the real-world vehicle is based at least in part on executing the component.

N. The system of any one of paragraphs G-M, wherein the modification is further based at least in part on reducing at least one of an average reward or a total reward determined in association with the vehicle during two or more iterations of performance by the vehicle.

O. A non-transitory computer-readable medium storing processor-executable instructions that, when executed by one or more processors, cause the one or more processors to perform operations comprising: receiving scenario data; generating a simulation based at least in part on the scenario data; determining a first reward associated with performance of the vehicle in the simulation over a first period of time; determining a modification to the scenario data based at least in part on the first reward, wherein the modification alters the scenario data such that a subsequent reward determined in association with operation of the vehicle over a second time is less than the first reward; determining an instruction for controlling motion of the object based at least in part on the first reward, wherein the instruction causes the object to take an action such that the subsequent reward is less than the first reward; and executing a simulation based at least in part on the modification to the scenario data, wherein executing the simulation comprises controlling motion of the object in a simulated environment based at least in part on the instruction.

P. The non-transitory computer-readable medium of paragraph O, wherein the operations further comprise: receiving sensor data associated with the vehicle; determining the scenario data based at least in part on the sensor data; determining an event that is predicted to cause the vehicle to violate an operating constraint; and controlling the vehicle to avoid actions that increase a likelihood of occurrence of the event.

Q. The non-transitory computer-readable medium of either paragraph O or P, wherein determining the first reward comprises: determining a first sub-reward based at least in part on whether performance of the vehicle conformed an operating constraint specifying a threshold characteristic for operation of the vehicle; determining a second sub-reward based at least in part on an output determined by a machine-learned model based at least in part on the performance of the vehicle, the output indicating a likelihood that a simulated representation of the vehicle will impact a second object; and determining, via a weighted sum, the first reward based at least in part on the first sub-reward and the second sub-reward.

R. The non-transitory computer-readable medium of any one of paragraphs O-Q, wherein: determining the instruction for controlling motion of the object comprises training a machine-learned model for controlling motion of the object in the simulated environment; training the machine-learned model comprises altering the machine-learned model to decrease the first reward; and altering the machine-learned model is limited by one or more constraints associated with controlling at least one of position or motion of the object.

S. The non-transitory computer-readable medium of any one of paragraphs O-R, wherein: the performance of the vehicle is a real-world performance; the scenario data is determined based at least in part on sensor data received in association with the vehicle and the environment; and the operations further comprise determining, based at least in part on the modification, the simulation, and the instruction, an event that is predicted to cause the vehicle to violate an operating constraint, wherein the event indicates a state of the object relative to the vehicle and a state of the environment.

T. The non-transitory computer-readable medium of any one of paragraphs O-S, wherein the performance of the vehicle, the object, and the environment are simulated; and the operations further comprise: modifying a machine-learned component of the vehicle based at least in part on determining a third reward associated with performance of the vehicle over a third time period during execution of the simulation; and transmitting the machine-learned component to a real-world vehicle, wherein operation of the real-world vehicle is based at least in part on executing the component.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:
1. A method comprising:
receiving scenario data indicating a type of object and an object position relative to an environment and a vehicle;
generating a first simulation based at least in part on the scenario data;
determining a first reward associated with performance of the vehicle in the first simulation over a first period of time;
determining a modification to the scenario data based at least in part on the first reward;
determining an instruction for controlling motion of the object based at least in part on the first reward, wherein at least one of the modification alters the scenario data or the instruction determines an action for controlling the object such that a subsequent reward determined in association with operation of the vehicle during a second simulation is estimated to be less than the first reward;
executing the second simulation based at least in part on the modification to the scenario data, wherein executing the second simulation comprises controlling operation of the vehicle and controlling motion of the object in a simulated environment based at least in part on the instruction;
validating a component of the vehicle based at least in part on at least one of the first simulation or the second simulation; and
transmitting the component to a real-world vehicle, wherein operation of the real-world vehicle is based at least in part on executing the component.

2. The method of claim 1, wherein determining the first reward comprises:
  determining a first sub-reward based at least in part on whether performance of the vehicle conformed an operating constraint specifying a threshold characteristic for operation of the vehicle;
  determining a second sub-reward based at least in part on an output determined by a machine-learned model based at least in part on the performance of the vehicle, the output indicating a likelihood that a simulated representation of the vehicle will impact a second object; and
  determining, via a weighted sum, the first reward based at least in part on the first sub-reward and the second sub-reward.

3. The method of claim 1, wherein:
  determining the instruction for controlling motion of the object comprises training a machine-learned model for controlling motion of the object in the simulated environment;
  training the machine-learned model comprises altering the machine-learned model to decrease the first reward; and
  altering the machine-learned model is limited by one or more constraints associated with controlling at least one of position or motion of the object.

4. The method of claim 1, wherein:
  the performance of the vehicle is a real-world performance;
  the scenario data is determined based at least in part on sensor data received in association with the vehicle and the environment; and
  the method further comprises determining, based at least in part on the modification, the second simulation, and the instruction, a prospective scenario that is predicted to cause the vehicle to violate an operating constraint, wherein the prospective scenario indicates a state of the object relative to the vehicle and a state of the environment.

5. The method of claim 4, wherein:
  determining the modification, determining the instruction, and executing the second simulation are executed by a remote device; and
  the method further comprises at least one of:
    determining an action that increases a likelihood of the prospective scenario occurring;
    causing a warning to be displayed via a teleoperations device in association with a teleoperations option that causes the action to occur or that causes the vehicle to include the action as an option for controlling the vehicle; or
    preventing the teleoperations option from being at least one of input or displayed.

6. The method of claim 1, wherein:
  the component is a machine-learned component;
  the performance of the vehicle and the object simulated; and
  the method further comprises:
    modifying the machine-learned component of the vehicle based at least in part on determining a second reward associated with performance of the vehicle during execution of the second simulation; and
    transmitting the machine-learned component to the real-world vehicle, wherein operation of the real-world vehicle is based at least in part on executing the component.

7. A system comprising:
  one or more processors; and
  a memory storing processor-executable instructions that, when executed by the one or more processors, cause the system to perform operations comprising:
    receiving scenario data indicating an object and a vehicle;
    generating a first simulation based at least in part on the scenario data;
    determining a first reward associated with performance of the vehicle in the first simulation over a first period of time;
    determining a modification to the scenario data based at least in part on the first reward;
    determining an instruction for controlling motion of the object based at least in part on the first reward, wherein at least one of the modification alters the scenario data or the instruction determines an action for controlling the object such that a subsequent reward determined in association with operation of the vehicle during a second simulation is estimated to be less than the first reward; and
    executing the second simulation based at least in part on the modification to the scenario data, wherein executing the second simulation comprises controlling operation of the vehicle and controlling motion of the object in a simulated environment based at least in part on the instruction;
    validating a component of the vehicle based at least in part on at least one of the first simulation or the second simulation; and
    transmitting the component to a real-world vehicle, wherein operation of the real-world vehicle is based at least in part on executing the component.

8. The system of claim 7, wherein the operations further comprise:
  receiving sensor data associated with the vehicle;
  determining the scenario data based at least in part on the sensor data;
  determining an event that is predicted to cause the vehicle to violate an operating constraint; and
  controlling the vehicle to avoid actions that increase a likelihood of occurrence of the event.

9. The system of claim 7, wherein determining the first reward comprises:
  determining a first sub-reward based at least in part on whether performance of the vehicle conformed an operating constraint specifying a threshold characteristic for operation of the vehicle;
  determining a second sub-reward based at least in part on an output determined by a machine-learned model based at least in part on the performance of the vehicle, the output indicating a likelihood that a simulated representation of the vehicle will impact a second object; and
  determining, via a weighted sum, the first reward based at least in part on the first sub-reward and the second sub-reward.

10. The system of claim 7, wherein:
  determining the instruction for controlling motion of the object comprises training a machine-learned model for controlling motion of the object in the simulated environment;
  training the machine-learned model comprises altering the machine-learned model to decrease the first reward; and altering the machine-learned model is limited by one or more constraints associated with controlling at least one of position or motion of the object.

11. The system of claim 7, wherein:
the performance of the vehicle is a real-world performance;
the scenario data is determined based at least in part on sensor data received in association with the vehicle and an environment; and
the operations further comprise determining, based at least in part on the modification, the second simulation, and the instruction, an event that is predicted to cause the vehicle to violate an operating constraint, wherein the event indicates a state of the object relative to the vehicle and a state of the environment.

12. The system of claim 11, wherein:
determining the modification, determining the instruction, and executing the second simulation are executed by a remote device; and
the operations further comprise at least one of:
 determining an action that increases a likelihood of the event occurring;
 causing a warning to be displayed via a teleoperations device in association with a teleoperations option that causes the action to occur or that causes the vehicle to include the action as an option for controlling the vehicle; or
 preventing the teleoperations option from being at least one of input or displayed.

13. The system of claim 7, wherein:
the component is a machine-learned component;
the performance of the vehicle and the object simulated; and
the operations further comprise:
 modifying the machine-learned component of the vehicle based at least in part on determining a second reward associated with performance of the vehicle during execution of the second simulation; and
 transmitting the machine-learned component to a real-world vehicle, wherein operation of the real-world vehicle is based at least in part on executing the component.

14. The system of claim 7, wherein the modification is further based at least in part on reducing at least one of an average reward or a total reward determined in association with the vehicle during two or more iterations of performance by the vehicle.

15. A non-transitory computer-readable medium storing processor-executable instructions that, when executed by one or more processors, cause the one or more processors to perform operations comprising:
receiving scenario data indicating an object and a vehicle;
generating a first simulation based at least in part on the scenario data;
determining a first reward associated with performance of the vehicle in the first simulation over a first period of time;
determining a modification to the scenario data based at least in part on the first reward;
determining an instruction for controlling motion of the object based at least in part on the first reward, wherein at least one of the modification alters the scenario data or the instruction determines an action for controlling the object such that a subsequent reward determined in association with operation of the vehicle during a second simulation is estimated to be less than the first reward;
executing the second simulation based at least in part on the modification to the scenario data, wherein executing the second simulation comprises controlling operation of the vehicle and controlling motion of the object in a simulated environment based at least in part on the instruction;
validating a component of the vehicle based at least in part on at least one of the first simulation or the second simulation; and
transmitting the component to a real-world vehicle, wherein operation of the real-world vehicle is based at least in part on executing the component.

16. The non-transitory computer-readable medium of claim 15, wherein the operations further comprise:
receiving sensor data associated with the vehicle;
determining the scenario data based at least in part on the sensor data;
determining an event that is predicted to cause the vehicle to violate an operating constraint; and
controlling the vehicle to avoid actions that increase a likelihood of occurrence of the event.

17. The non-transitory computer-readable medium of claim 15, wherein determining the first reward comprises:
determining a first sub-reward based at least in part on whether performance of the vehicle conformed an operating constraint specifying a threshold characteristic for operation of the vehicle;
determining a second sub-reward based at least in part on an output determined by a machine-learned model based at least in part on the performance of the vehicle, the output indicating a likelihood that a simulated representation of the vehicle will impact a second object; and
determining, via a weighted sum, the first reward based at least in part on the first sub-reward and the second sub-reward.

18. The non-transitory computer-readable medium of claim 15, wherein:
determining the instruction for controlling motion of the object comprises training a machine-learned model for controlling motion of the object in the simulated environment;
training the machine-learned model comprises altering the machine-learned model to decrease the first reward; and
altering the machine-learned model is limited by one or more constraints associated with controlling at least one of position or motion of the object.

19. The non-transitory computer-readable medium of claim 15, wherein:
the performance of the vehicle is a real-world performance;
the scenario data is determined based at least in part on sensor data received in association with the vehicle and an environment; and
the operations further comprise determining, based at least in part on the modification, the second simulation, and the instruction, an event that is predicted to cause the vehicle to violate an operating constraint, wherein the event indicates a state of the object relative to the vehicle and a state of the environment.

20. The non-transitory computer-readable medium of claim 15, wherein:
the component is a machine-learned component;
the performance of the vehicle and the object are simulated; and the operations further comprise:
- modifying the machine-learned component of the vehicle based at least in part on determining a second reward associated with performance of the vehicle during execution of the second simulation; and
- transmitting the machine-learned component to the real-world vehicle, wherein operation of the real-world vehicle is based at least in part on executing the component.

* * * * *